United States Patent [19]

Best et al.

[11] Patent Number: 5,446,723
[45] Date of Patent: Aug. 29, 1995

[54] MULTIPLE DATA SURFACE OPTICAL DATA STORAGE SYSTEM

[75] Inventors: Margaret E. Best, San Jose; Hal J. Rosen, Los Gatos; Kurt A. Rubin, Santa Clara; Timothy C. Strand, San Jose, all of Calif.

[73] Assignee: International Business Machines Corporation, Armonk, N.Y.

[21] Appl. No.: 371,309

[22] Filed: Jan. 10, 1995

Related U.S. Application Data

[60] Continuation of Ser. No. 79,473, Jun. 18, 1993, abandoned, which is a division of Ser. No. 710,226, Jun. 4, 1991, Pat. No. 5,255,262.

[51] Int. Cl.⁶ .......................... G11B 7/24; G11B 7/095
[52] U.S. Cl. ................................ 369/275.1; 369/94; 369/109; 369/111; 369/275.4; 369/44.11; 369/44.14
[58] Field of Search ............ 369/44.11, 44.14, 44.18, 369/44.22, 44.26, 44.28, 44.29, 100, 275.1, 275.3, 275.4

[56] References Cited

U.S. PATENT DOCUMENTS

| | | | |
|---|---|---|---|
| 3,946,367 | 3/1976 | Wohlmut et al. | 340/173 |
| 3,999,009 | 12/1976 | Bouwhuis | 358/128 |
| 4,219,704 | 8/1980 | Russell | 179/100.3 |
| 4,298,975 | 11/1981 | van der Veen et al. | 369/94 |
| 4,359,750 | 11/1982 | Howe | 369/111 |
| 4,450,553 | 5/1984 | Holster et al. | 369/275 |
| 4,668,550 | 5/1987 | Tajima et al. | 428/65 |
| 4,682,321 | 7/1987 | Takaoka et al. | 369/284 |
| 4,734,904 | 3/1988 | Imanaka et al. | 369/109 |
| 4,737,427 | 4/1988 | Miyazaki et al. | 430/19 |
| 4,821,251 | 4/1989 | Hosoya | 369/111 |
| 4,829,505 | 5/1989 | Boyd et al. | 369/94 |
| 4,845,021 | 7/1989 | Miyazaki et al. | 430/495 |
| 4,852,077 | 7/1989 | Clark et al. | 369/284 |
| 4,860,273 | 8/1989 | Sawano et al. | 369/100 |
| 4,905,215 | 2/1990 | Hattori et al. | 369/14 |
| 4,985,616 | 1/1991 | Nakamura et al. | 235/494 |
| 5,031,172 | 7/1991 | Umeda et al. | 369/275.001 |
| 5,077,120 | 12/1991 | Kato et al. | 428/200 |
| 5,097,464 | 3/1992 | Nishiuchi et al. | 369/112 |
| 5,132,960 | 7/1992 | Hosokawa et al. | 369/284 |
| 5,202,875 | 4/1993 | Rosen et al. | 369/94 |
| 5,255,262 | 10/1993 | Best et al. | 369/275.1 |
| 5,278,816 | 1/1994 | Russell | 369/100 |
| 5,381,401 | 1/1995 | Best et al. | 369/275.1 |

FOREIGN PATENT DOCUMENTS

| | | | |
|---|---|---|---|
| 0192244A1 | 8/1986 | European Pat. Off. | G11B 7/24 |
| 0289352A2 | 11/1988 | European Pat. Off. | G11B 7/24 |
| 0368442A2 | 5/1990 | European Pat. Off. | G11B 7/24 |
| 0414380A3 | 2/1991 | European Pat. Off. | G11B 7/135 |
| 3724622 | 1/1988 | Germany | G11B 7/013 |
| 58-62838 | 4/1983 | Japan | G11B 7/24 |
| 202545 | 10/1985 | Japan | . |
| 60-219647 | 11/1985 | Japan | G11B 7/24 |
| 63-117332 | 5/1988 | Japan | . |
| 276732 | 11/1988 | Japan | . |
| 3080443 | 4/1991 | Japan | G11B 7/24 |
| 3122847 | 5/1991 | Japan | G11B 11/10 |
| 2017379 | 10/1979 | United Kingdom | G11B 7/24 |

OTHER PUBLICATIONS

IBM Technical Disclosure Bulletin, vol. 30, No. 2, Jul. 1987, pp. 667–669.

*Primary Examiner*—Viet Q. Nguyen
*Attorney, Agent, or Firm*—Douglas R. Millett

[57] ABSTRACT

An optical data storage system comprises a multiple data surface medium and optical head. The medium comprises a plurality of substrates separated by a light transmissive medium. Data surfaces are located on the substrate surfaces which lie adjacent a light transmissive medium. The data surfaces are substantially light transmissive. The optical head includes an aberration compensator to allow the head to focus onto the different data surfaces and a filter to screen out unwanted reflected light.

38 Claims, 14 Drawing Sheets

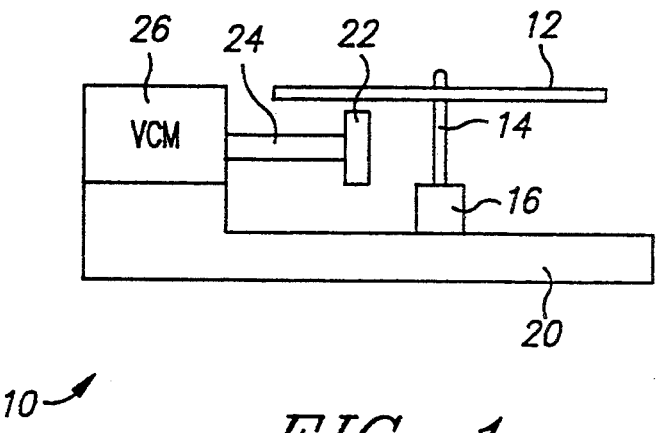
FIG. 1
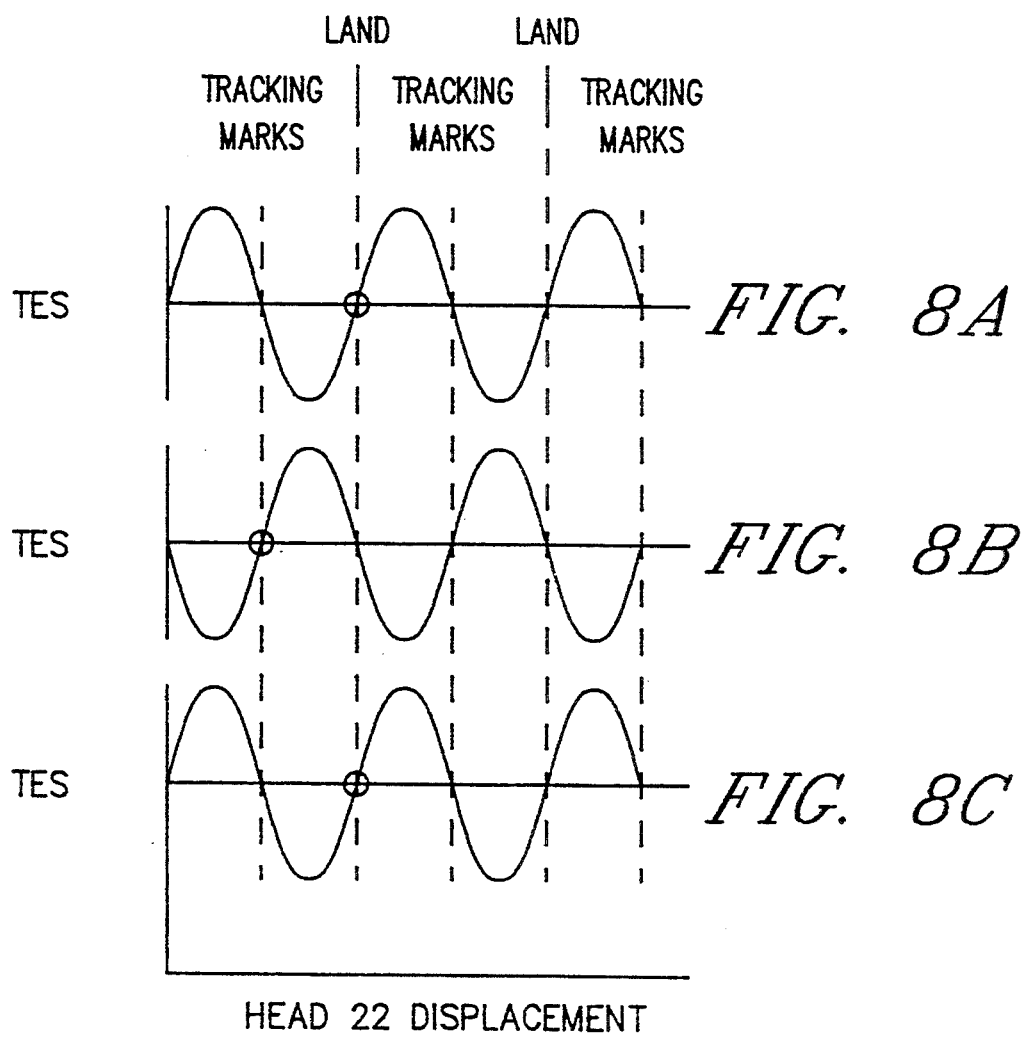
FIG. 8A
FIG. 8B
FIG. 8C
HEAD 22 DISPLACEMENT

LENS 210 DISPLACEMENT

TO MIRROR 208

MULTIPLE DATA SURFACE OPTICAL DATA STORAGE SYSTEM

This is a continuation of application Ser. No. 079,473, filed Jun. 8, 1993, now abandoned which is a division of application Ser. No. 07/710,226, filed Jun. 4, 1991, now U.S. Pat. No. 5,255,262.

BACKGROUND OF THE INVENTION

1. Field of the Invention

This invention relates generally to optical data storage systems and more specifically to a storage system having multiple data storage surfaces.

2. Description of the Prior Art

Optical data storage systems provide a means for storing great quantities of data on a disk. The data is accessed by focussing a laser beam onto the data layer of the disk and then detecting the reflected light beam. Various kinds of systems are known. In a ROM (Read Only Memory) system, data is permanently embedded as marks in the disk at the time of manufacture of the disk. The data is detected as a change in reflectivity as the laser beam passes over the data marks. A WORM (Write-Once Read Many) system allows the user to write data by making marks, such as pits, on a blank optical disk surface. Once the data is recorded onto the disk it cannot be erased. The data in a WORM system is also detected as a change in reflectivity Erasable optical systems are also known. These systems use the laser to heat the data layer above a critical temperature in order to write and erase the dam. Magneto-optical recording systems record data by orienting the magnetic domain of a spot in either an up or a down position. The data is read by directing a low power laser to the data layer. The differences in magnetic domain direction cause the plane of polarization of the light beam to be rotated one way or the other, clockwise or counterclockwise. This change in orientation of polarization is then detected. Phase change recording uses a structural change of the data layer itself (amorphous/-crystalline are two common types of phases) to record the data. The data is detected as changes in reflectivity as a beam passes over the different phases.

In order to increase the storage capacity of an optical disk, multiple data layer systems have been proposed. An optical disk having two or more data layers may in theory be accessed at different layers by changing the focal position of the lens. Examples of this approach include U.S. Pat. No. 3,946,367 issued Mar. 23, 1976 by Wohlmut, et al.; U.S. Pat. No. 4,219,704 issued Aug. 26, 1980 to Russell; U.S. Pat. No. 4,450,553 issued May 22, 1984 to Holster, et al.; U.S. Pat. No. 4,905,215 issued Feb. 27, 1990 to Hattori, et al.; Japanese Published Application, 63-276732 published Nov. 15, 1988 by Watanabe, et al.; and IBM Technical Disclosure Bulletin, Vol. 30, No. 2, p. 667, July 1987, by Arter, et al.

The problem with these prior art systems has been that the ability to clearly read the data recorded is very difficult if there is more than one data layer. The crosstalk signals from the other data layers greatly reduces the ability to read. Also, there are problems in focussing at the different depths and in generating a tracking signal. An optical data storage system is needed which overcomes these problems.

SUMMARY OF THE INVENTION

In a preferred embodiment of the invention, an optical data storage system comprises an optical disk drive and a multiple data surface optical medium. The medium has a plurality of substrate members separated by air spaces. The surfaces of the substrate members which are adjacent to the air spaces are the data surfaces. The data surfaces are highly transmissive with the exception of the last data layer which may include a reflector layer. Each data surface has tracking marks.

The disk drive comprises a laser for generating a laser beam. An optical transmission channel directs the light to the medium. The transmission channel includes a focus element for focussing the light onto the different data surfaces and an aberration compensator element to correct for aberrations due to variations in the effective substrate thickness. A reception channel receives reflected light from the medium. The reception channel includes a filter element to screen out unwanted light reflected from data surfaces other than the one to be read. The reception channel has detectors for receiving the reflected light and circuitry for generating data and servo signals responsive thereto.

For a fuller understanding of the nature and advantages of the present invention reference should be made to the following detailed description taken in conjunction with the accompanying drawings.

BRIEF DESCRIPTION OF THE DRAWINGS

FIG. 1 is a schematic diagram of an optical data storage stem of the present invention;

FIG. 8A is a graph of tracking error signal versus head displacement;

FIG. 8B is a graph of tracking error signal versus head displacement for an alternative embodiment;

FIG. 8C is a graph of tracking error signal versus head displacement for an alternative embodiment;

DESCRIPTION OF THE PREFERRED EMBODIMENTS

Figure 2A:
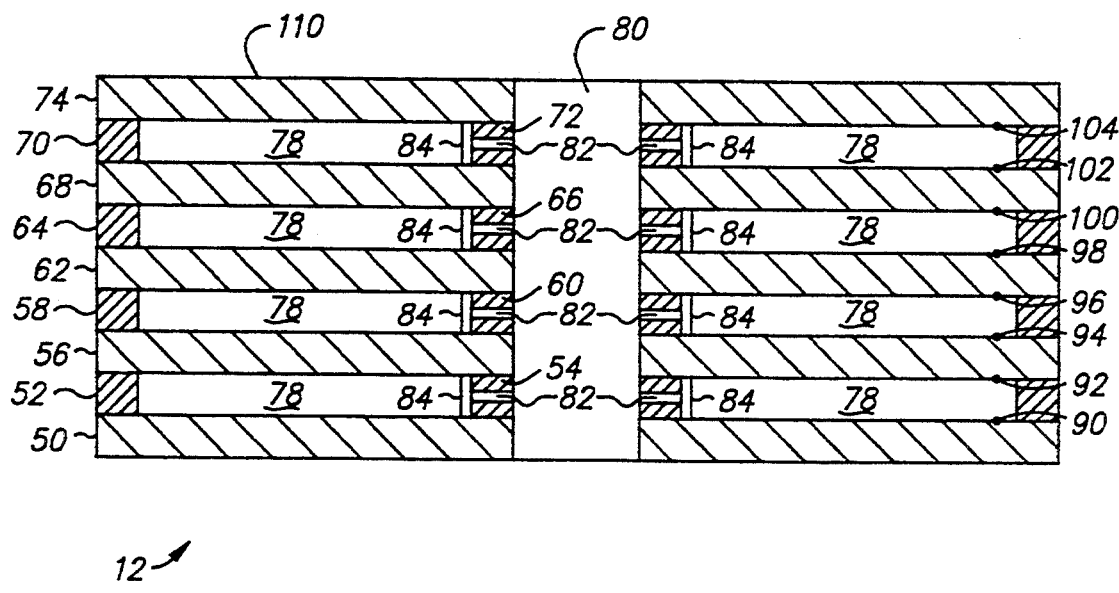
FIG. 2A is a cross-sectional view of an optical medium of the present invention.

The present application is related to concurrently filed U.S. Patent applications "Multiple Data Surface Optical Data Storage System and Method" by H. Rosen, K. Rubin, G. Sincerbox, T. Strand and J. Zavislan, and "Multiple Data Surface Data Storage System and Method" by H. Rosen, K. Rubin and T. Strand.

FIG. 1 shows a schematic diagram of an optical data storage system of the present invention and is designated by the general reference number 10. System 10 includes an optical data storage medium 12 which is preferably disk shaped. Medium 12 is removably mounted on a clamping spindle 14 as is known in the art. Spindle 14 is attached to a spindle motor 16 which in turn is attached to a system chassis 20. Motor 16 rotates spindle 14 and medium 12.

An optical head 22 is positioned below medium 12. Head 22 is attached to an arm 24 which in turn is connected to an actuator device, such as a voice coil motor 26. Voice coil motor 26 is attached to chassis 20. Motor 26 moves arm 24 and head 22 in a radial direction below medium 12.

The Optical Medium

FIG. 2A is a cross-sectional view of medium 12. Medium 12 has a substrate 50. Substrate 50 is also known as the face plate or cover plate and is where the laser beam enters medium 12. An outer diameter (OD) rim 52 and an inner diameter (ID) rim 54 are attached between face plate 50 and a substrate 56. An OD rim 58 and an ID rim 60 are attached between substrate 56 and a substrate 62. An OD rim 64 and an ID rim 66 are attached between substrates 62 and a substrate 68. An OD rim 70 and ID rim 72 are attached between substrates 68 and a substrate 74. Face plate 50 and substrates 56, 62, 68 and 74 are made of a light transmissive material such as glass, polycarbonate or other polymer material. In a preferred embodiment, face plate 50 is 1.2 mm thick and substrates 56, 62, 68 and 74 are 0.4 mm thick. The substrate may alternatively have thicknesses of 0.2 to 0.8 mm. The ID and OD rims are preferably made of a plastic material and are approximately 500 microns thick. The rims may alternatively have thicknesses of 50-500 microns.

The rims may be attached to the face plate and substrates by means of glue, cement or other bonding process. The rims may alternatively be integrally formed in the substrates. When in place, the rims form a plurality of annular spaces 78 between the substrates and the face plate. A spindle aperture 80 passes through medium 12 inside the ID rims for receiving the spindle 14. A plurality of passages 82 are provided in the ID rims connecting the aperture and the spaces 78 to allow pressure equalization between the spaces 78 and the surrounding environment of the disk file, which would typically be air. A plurality of low impedance filters 84 are attached to passages 82 to prevent contamination of spaces 78 by particulate matter in the air. Filters 84 may be quartz or glass fiber. Passages 82 and filters 84 could alternatively be located on the OD rim.

Surfaces 90, 92, 94, 96, 98, 100, 102 and 104 are data surfaces and lie adjacent spaces 78. These data surfaces may contain ROM data which is formed directly into the substrate surfaces or, alternatively the data surfaces may be coated with one of the various writeable optical storage films such as WORM, or one of the various erasable o optical storage films such as phase change, or magneto-optical. Other than the optical storage films themselves, the data surfaces are made without the separate metallic reflector layer structures (reflectivity from 30-100%) which are known in the prior art such as U.S. Pat. No. 4,450,553. In other words, the data surfaces may comprise, consist of or essentially consist of the surface itself in the case of a ROM surface or the surface and an optical storage film in the case of WORM, phase change or magneto-optic surfaces. An additional nondata storing reflector layer is not needed. The result is that the data surfaces are very light transmissive and many data surfaces are possible. Although the intermediate data surfaces do not have reflector layers, a reflector layer may optionally be added behind the last data surface 104 to achieve greater reflection from the last data surface 104.

In the preferred embodiment, the data surfaces are ROM surfaces. Data is permanently recorded as pits which are formed directly into the substrate at the time the disk is manufactured. In contrast to the prior art; the ROM surfaces of the present invention do not have metallic reflector layers. The substrates have no coatings. The result is that the transmissivity of each data surface is approximately 96%. The 4% reflectivity is sufficient to detect the data. The high transmissivity has the benefit of allowing a large number of data surfaces to be accessed and minimizes the effects of unwanted signals from other surfaces. Since there are no coatings on these surfaces, they are easier to manufacture and are more resistant to corrosion.

Although it is not necessary, it may be desirable to increase the reflectivity to reduce the required laser power. One way to increase the reflectivity above 4% is to apply a thin film coating of a dielectric which has an index of refraction greater than the substrate. The maximum reflectivity of 20% occurs at a dielectric thickness of approximately $\lambda/4n$, and varies monotonically to a minimum reflectivity of 4% at a thickness of approximately $\lambda/2n$, where $\lambda$ is the wavelength of the light and n is the index of refraction of the dielectric. Examples of such dielectric materials are $ZrO_2$, ZnS, $SiN_x$ or mixed oxides. The dielectric may be deposited by sputtering as is known in the art.

The reflectivity of the data layer can also be reduced below 4%. This increases the transmittance and allows more disks to be stacked. The reduction in reflectivity occurs when a dielectric film which has an index of refraction less than the substrate is used. One such dielectric is MnF which has a index of refraction of 1.35. The minimum reflectivity of 1% occurs at a dielectric thickness of approximately $\lambda/4n$, and varies monotonically to a maximum reflectivity of 4% at a thickness of approximately $\lambda/2n$, where $\lambda$ is the wavelength of the light and n is the index of refraction. There are many other thin film anti-reflection materials which could also be used. These anti-reflection films may be applied by sputtering processes as are known in the art.

The data surfaces may alteratively contain WORM data. WORM films such as tellurium-selenium alloys or phase change WORM films may be coated onto the data surfaces. The films are vacuum deposited by sputtering or evaporation onto the substrate as is known in the art. The amount of reflection, absorption, and transmission of each film is related to its thickness and optical constants. In a preferred embodiment, tellurium-selenium alloy is deposited at a thickness of 20-800 Angstroms.

The data surface may alternatively contain reversible phase change films. Any type of phase change films may be used, however, preferred compositions include those that lie along or close to the tieline connecting GeTe and $Sb_2Te_3$, which include $Te_{2.5}Ge_{15.3}Sb_{33}$, $Ge_2Sb_2Te_5$, $GeSb_2Te_4$ and $GeSb_4Te_7$. The films are vacuum deposited by sputtering processes as are known in the art onto the substrate to a thickness between 20–800 Angstroms. An optional protective overcoat of 3,000 Angstroms of dielectric may be formed on top of the phase change film in order to help prevent ablation.

Data surfaces may also alternatively contain magneto-optical films. Magneto-optical film such as rare earth transition metals are vacuum deposited by sputtering processes as are known in the art onto the substrate to a thickness of 20–800 Angstroms.

A further alternative is to have the data surfaces contain a combination of ROM, WORM, or erasable media. The higher transmission surfaces such as ROM are preferably located closer to the light source and the lower transmission surfaces such o as WORM, phase change and magneto-optical are preferably located furthest away. The dielectric and anti-reflection films described above with the ROM surface may also be used with WORM and erasable media.

Figure 2B:
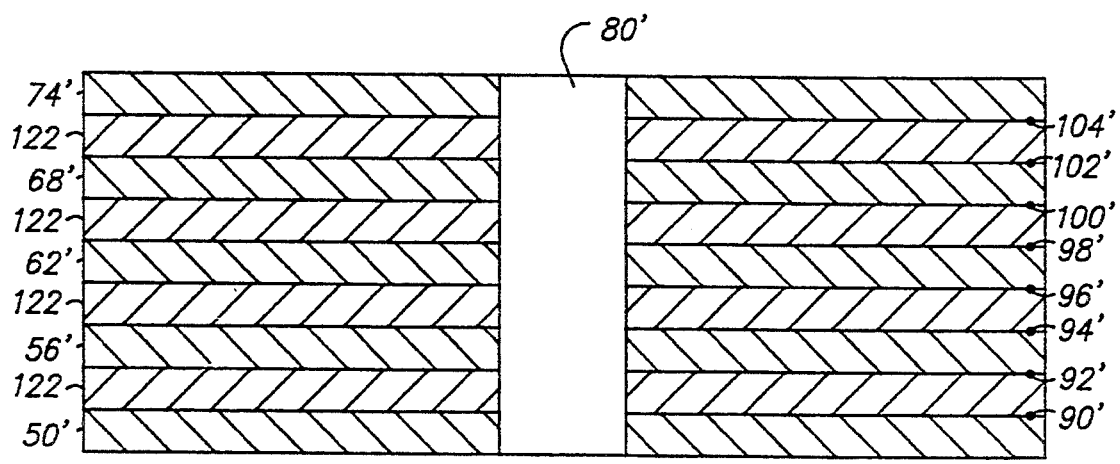
FIG. 2B is a cross-sectional view of an alternative optical medium.

FIG. 2B is a cross-sectional view of an alternative embodiment of an optical recording medium and is designated by the general reference number 120. Elements of medium 120 which are similar to elements of medium 12 are designated by a prime number. Medium 120 does not have the rims and spaces 78 of medium 12. Instead, a plurality of solid transparent members 122 separates the substrates. Members 122 are made of a material having a different index of refraction than the substrates. This is necessary to achieve some reflection at the data surfaces. In a preferred embodiment, the members 122 are made of an optical cement which also serves to hold the substrate together. The thickness of members 122 is preferably approximately 100-300 microns. Medium 120 may be substituted for medium 12 in system 10.

Figure 3A:
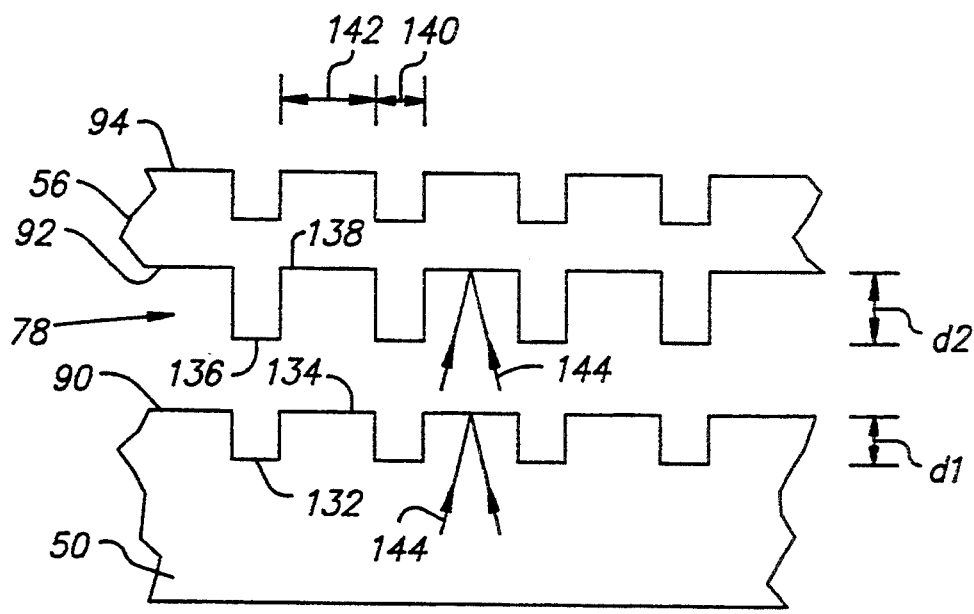
FIG. 3A is a cross-sectional view of the tracking marks of the medium of FIG. 2.

FIG. 3A shows an exaggerated detailed cross-sectional view of a preferred data surface pattern of medium 12 and is designated by the general reference number 130. Surface 90 contains a pattern of spiral (or alternatively concentric) tracking grooves 132. The portions of surface 90 located between the grooves 132 are known as the land portions 134. Surface 92 contains a pattern of spiral inverse tracking grooves (raised ridges) 136. The portion of surface 92 located between the inverse grooves 136 is the land 138. The grooves 132 and the inverse grooves 136 are also referred to as tracking marks. In a preferred embodiment, the widths 140 of the tracking marks are 0.6 microns and the width 142 of the land sections is 1.0 microns. This results in a pitch of (1.0+0.6)=1.6 microns.

The tracking marks are used to keep the light beam on track while the medium 12 rotates. This is described in more detail below. For pattern 130, a beam 144 from the optical head 22 will track on the land portion 134 or 138 depending upon which surface it is focussed upon. The recorded data is on the land portions. In order for the tracking errors signal (TES) to be of equal magnitude for both surfaces 90 and 92 the optical path difference between light reflected from the lands and tracking marks must be the same for both surfaces. Beam 144 focuses on surface 90 through substrate 50, however, beam 144 focuses on surface 92 through space 78. In the preferred embodiment space 78 contains air. For the optical path length difference between the lands and tracking marks to be the same d1n1 must equal d2n2 (or d2/d1 equals n1/n2), where d1 is the depth of mark 132 (perpendicular distance), n1 is the index of refraction of substrate 50, d2 is the height of mark 136 (perpendicular distance), and n2 is the index of refraction of space 78. In a preferred embodiment, space 78 contains air which has an index of refraction of 1.0 and substrate 50 (as well as the other substrates) has an index of refraction 1.5. So the ratio of d2/d1 equals 1.5. In a preferred embodiment, d1 is 700 Angstroms and d2 is 1050 Angstroms. The same pattern of tracking marks is repeated on the other surfaces of medium 12. The other substrate incident surfaces 94, 98 and 102 are similar to surface 90 and the other space incident surfaces 96, 100 and 104 are similar to surface 92.

Although the tracking marks are preferably arranged in a spiral pattern, they may alternatively be in a concentric pattern. In addition, the spiral pattern may be the same for each data surface, i.e., they are all clockwise or counter-clockwise spirals, or they may alternate between clockwise and counter-clockwise spiral patterns on consecutive data layers. This alternating spiral pattern may be preferable for certain applications, such as storage of video data, movies for example, where continuous tracking of data is desired. In such a case, the beam tracks the clockwise spiral pattern inward on the first data surface until the spiral pattern ends near the inner diameter, and then the beam is refocused on the second data surface directly below and then the beam tracks the counter-clockwise spiral pattern outward until the outer diameter is reached.

Figure 3B:
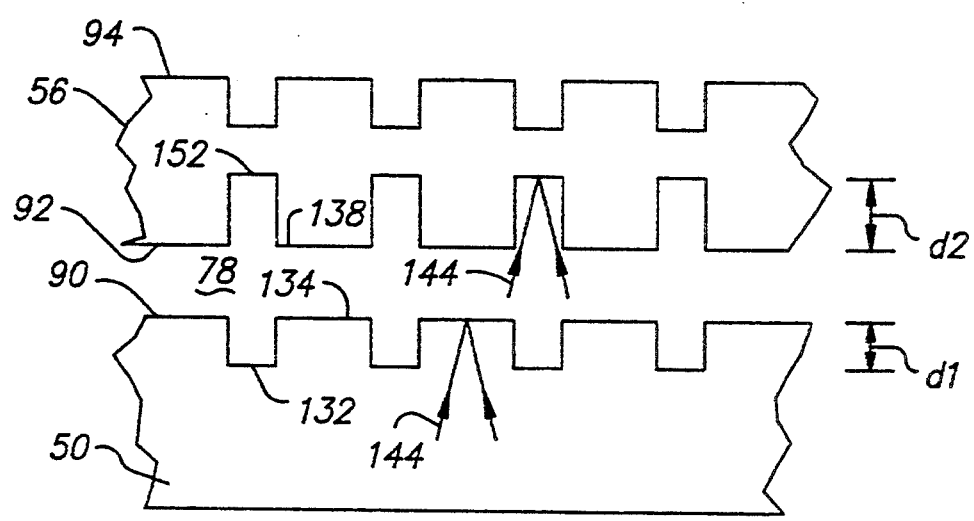
FIG. 3B is a cross-sectional view of alterative tracking marks.

FIG. 3B shows an exaggerated detailed cross-sectional view of an alternative surface pattern for medium 12 and is designated by the general reference number 150. Pattern 150 is similar to pattern 130 except that the tracking marks for surface 92 are grooves 152 instead of inverse grooves. The pitch and the ratio of d2/d1 are the same as for pattern 130. Beam 144 will track on land 134 on surface 90, but now beam 144 will track on groove 152 when focussed on surface 92. Tracking in the groove 132 may be desirable in certain situations. However, as will be described below, beam 144 may also be electronically controlled to track on land 138 of surface 92. The tracking marks for surfaces 94, 98 and 102 are similar to surface 90 and the surfaces 96, 100 and 104 are similar to surface 92.

Figure 3C:
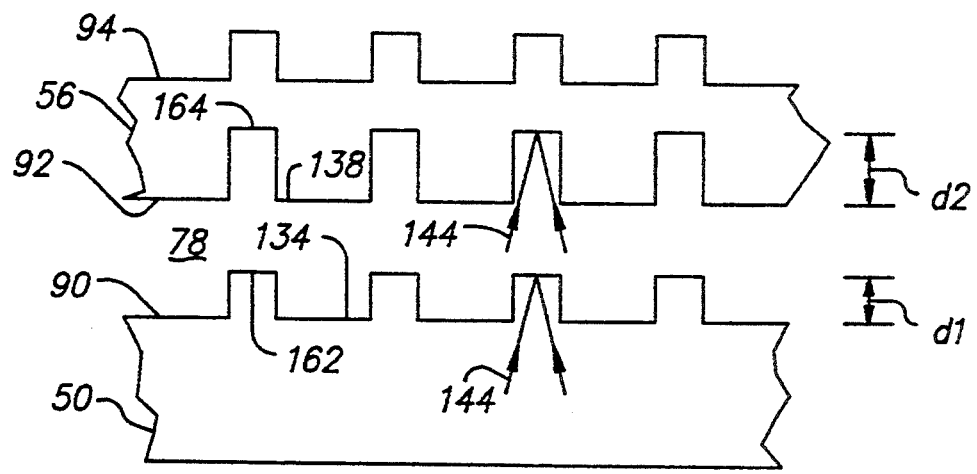
FIG. 3C is a cross-sectional view of alternative tracking marks.

FIG. 3C shows an exaggerated detailed cross-sectional view of an alternative surface pattern for medium 12 which is designated by the general reference number 160. Pattern 160 is similar to pattern 130 except that surface 90 has inverse grooves 162 instead of grooves 132, and surface 92 has grooves 164 instead of inverse grooves 136. The pitch and ratio of d2/d1 are the same as for pattern 130. Beam 144 will track on inverse grooves 162 when focussed on surface 90 and will track on grooves 164 when focussed on surface 92 (unless it is electronically switched to track on the land). The pattern for surfaces 94, 98 and 102 are similar to surface 90 and the surfaces 96, 100 and 104 are similar to surface 92.

Figure 3D:
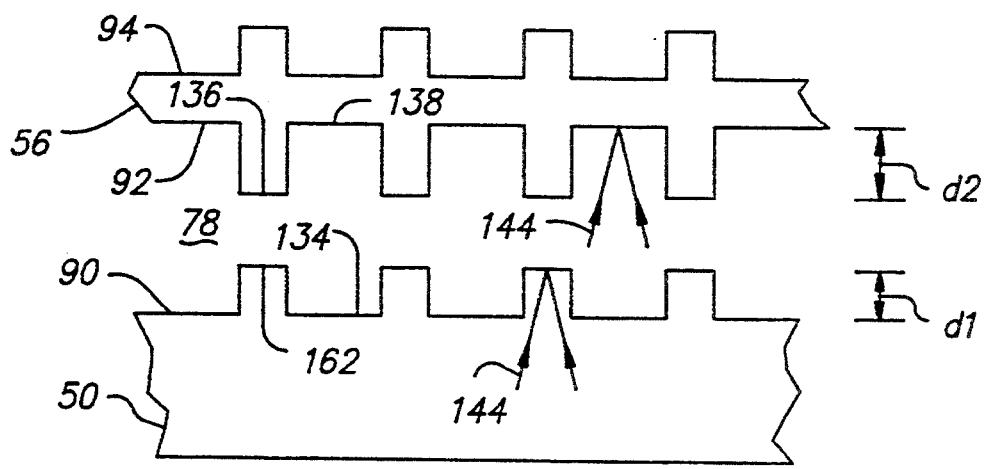
FIG. 3D is a cross-sectional view of alternative tracking marks.

FIG. 3D shows an exaggerated detailed cross-sectional view of an alternative surface pattern designated by the general reference number 170. In pattern 170, the surface 90 has a similar structure to surface 90 of pattern 160. Surface 92 has a similar structure to surface 92 of pattern 130. The pitch and ratio of d2/d1 is the same as for pattern 130. Beam 144 will track on inverse grooves 162 when focussed on surface 90 (unless it is electronically switched to track on the land) and will track on land 138 when focussed on surface 92. Surfaces 94, 98 and 102 have similar patterns to surface 90 and surfaces 96, 100 and 104 have patterns similar to surface 92.

For all of the patterns 130, 150, 160 and 170 the tracking marks are formed into the substrate at the time of manufacture by injection molding or photopolymer processes as are known in the art. It should be noted that the optical films, as described above, are deposited onto the substrates after the tracking marks are formed.

The discussion of tracking marks is also applicable to other features of optical disks. For example, some ROM disks use pits embossed in the substrate to record data and/or provide tracking information. Other optical media use pits to emboss sector header information. Some media use these header pits to also provide tracking, information. In using such media in the multiple data surface form of the present invention, the pits are formed as pits or inverse pits on the various data surfaces corresponding in a similar manner to the tracking marks discussed above. The optical path length between the lands and the pits or inverse pits is also similar to the tracking marks. The pits, inverse pits, grooves and inverse grooves are all located at a different elevation from the land (i.e. the perpendicular distance between them and the land), and are all referred to as marks for purposes of this discussion. Marks which are specifically dedicated to providing tracking information are known as nondata tracking marks.

The Optical Head

Figure 4:
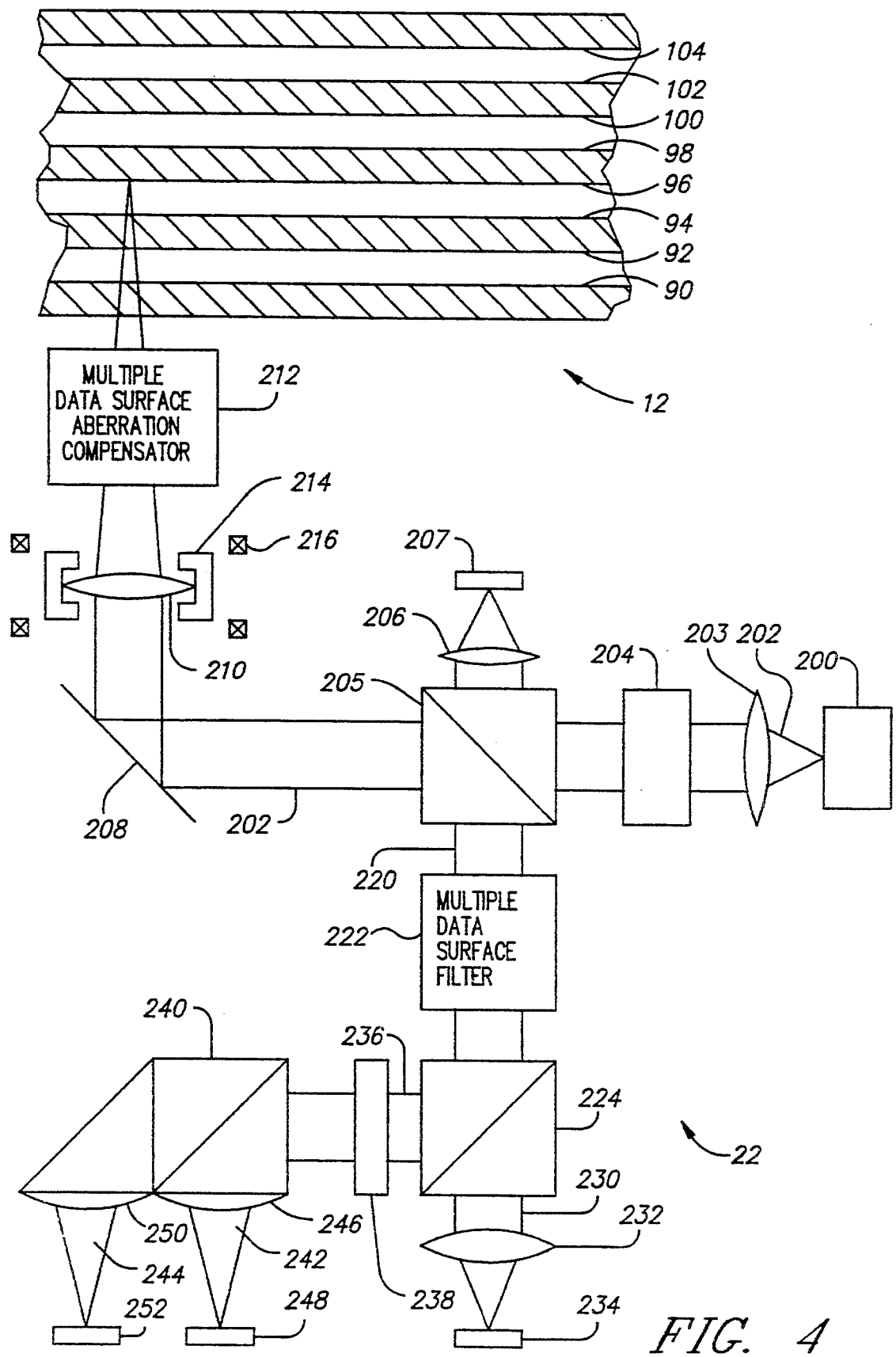
FIG. 4 is a schematic diagram of an optical head and medium of the present invention.

FIG. 4 shows a schematic diagram of an optical head 22 and medium 12. Optical head 22 has a laser diode 200. Laser 200 may be a gallium-aluminum-arsenide diode laser which produces a primary beam of light 202 at approximately 780 nanometers wavelength. Beam 202 is collimated by lens 203 and is circularized by a circularizer 204 which may be a circularizing prism. Beam 202 passes to a beamsplitter 205. A portion of beam 202 is reflected by beamsplitter 205 to a focus lens 206 and an optical detector 207. Detector 207 is used to monitor the power of beam 202. The rest of beam 202 passes to and is reflected by a mirror 208. Beam 202 then passes through a focus lens 210 and a multiple data surface aberration compensator 212 and is focused onto one of the data surfaces (surface 96 as shown) of medium 12. Lens 210 is mounted in a holder 214. The position of holder 214 is adjusted relative to medium 12 by a focus actuator motor 216 which may be a voice coil motor.

A portion of the light beam 202 is reflected at the data surface as a reflected beam 220. Beam 220 returns through compensator 212 and lens 210 and is reflected by mirror 208. At beamsplitter 205, beam 220 is reflected to a multiple data surface filter 222. The beam 220 passes through filter 222 and passes to a beamsplitter 224. At beamsplitter 224 a first portion 230 of beam 220 is directed to an astigmatic lens 232 and a quad optical detector 234. At beamsplitter 224 a second portion 236 of beam 220 is directed through a half-wave plate 238 to a polarizing beamsplitter 240. Beamsplitter 240 separates light beam 236 into a first orthogonal polarized light component 242 and a second orthogonal polarized light component 244. A lens 246 focuses light 242 to an optical detector 248 and a lens 250 focuses light 244 to an optical detector 252.

Figure 5:
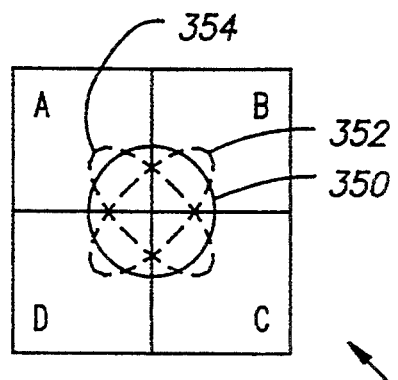
FIG. 5 is a top view of an optical detector of FIG. 4.

FIG. 5 shows a top view of a quad detector 234. The detector 234 is divided into four equal sections 234A, B, C and D.

Figure 6:
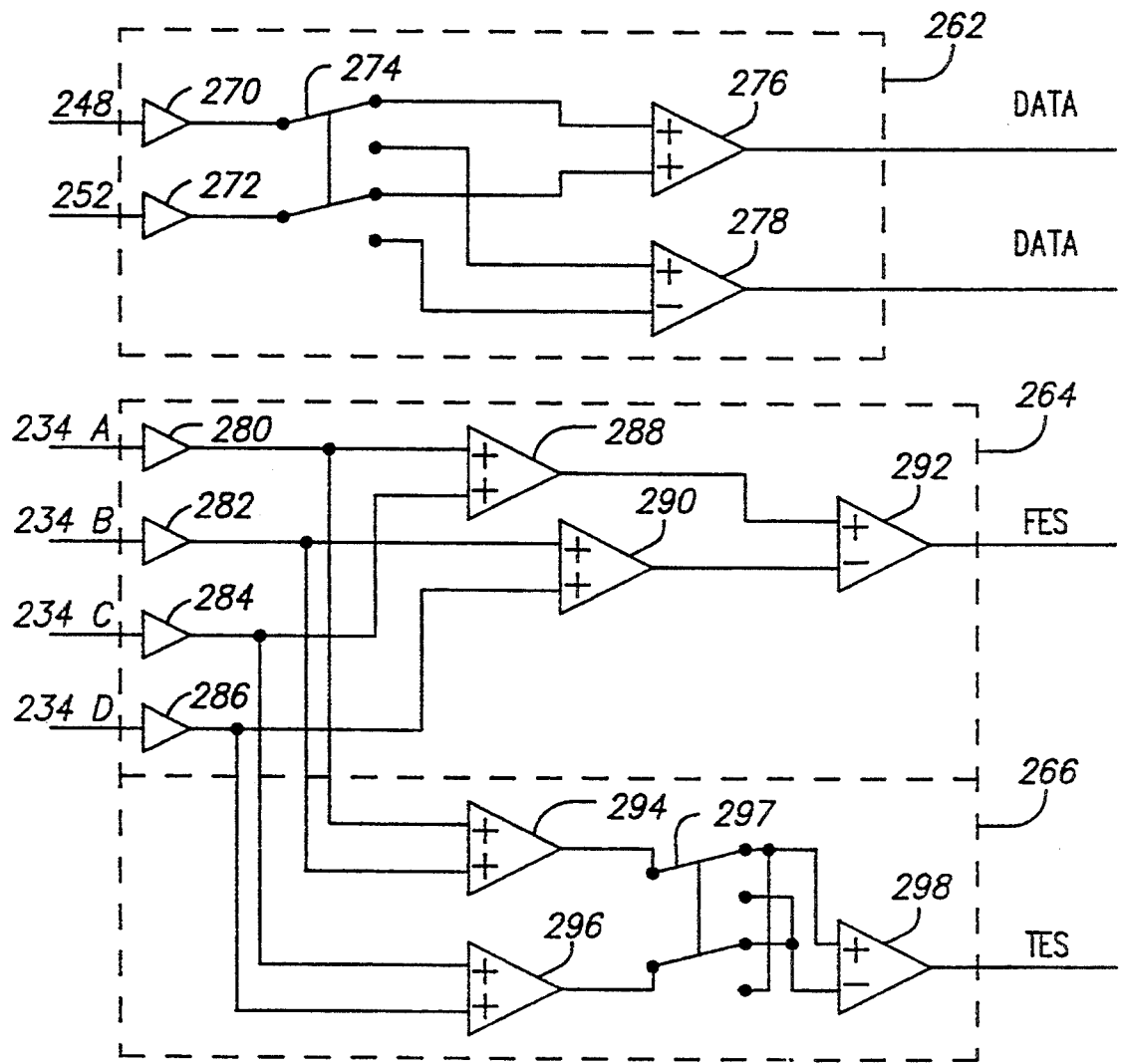
FIG. 6 is a circuit diagram of a channel circuit of the present invention.

FIG. 6 shows a circuit diagram of a channel circuit 260. Circuit 260 comprises a data circuit 262, a focus error circuit 264 and a tracking error circuit 266. Data circuit 262 has an amplifier 270 connected to detector 248 and an amplifier 272 connected to detector 252. Amplifiers 270 and 272 are connected to a double pole, double throw electronic switch 274. Switch 274 is connected to a summing amplifier 276 and a differential amplifier 278.

Circuit 264 has a plurality of amplifiers 280, 282, 284 and 286 connected to detector sections 234A, B, C and D, respectively. A summing amplifier 288 is connected to amplifiers 280 and 284, and a summing amplifier 290 is connected to amplifiers 282 and 286. A differential amplifier 292 is connected to summing amplifiers 288 and 290.

Circuit 266 has a pair of summing amplifiers 294 and 296, and a differential amplifier 298. Summing amplifier 294 is connected to amplifiers 280 and 282, and summing amplifier 296 is connected to amplifiers 284 and 286. Differential amplifier 298 is connected to summing amplifiers 294 and 296 via a double pole double throw electronic switch 297. Switch 297 acts to invert the inputs to amplifier 298.

Figure 7:
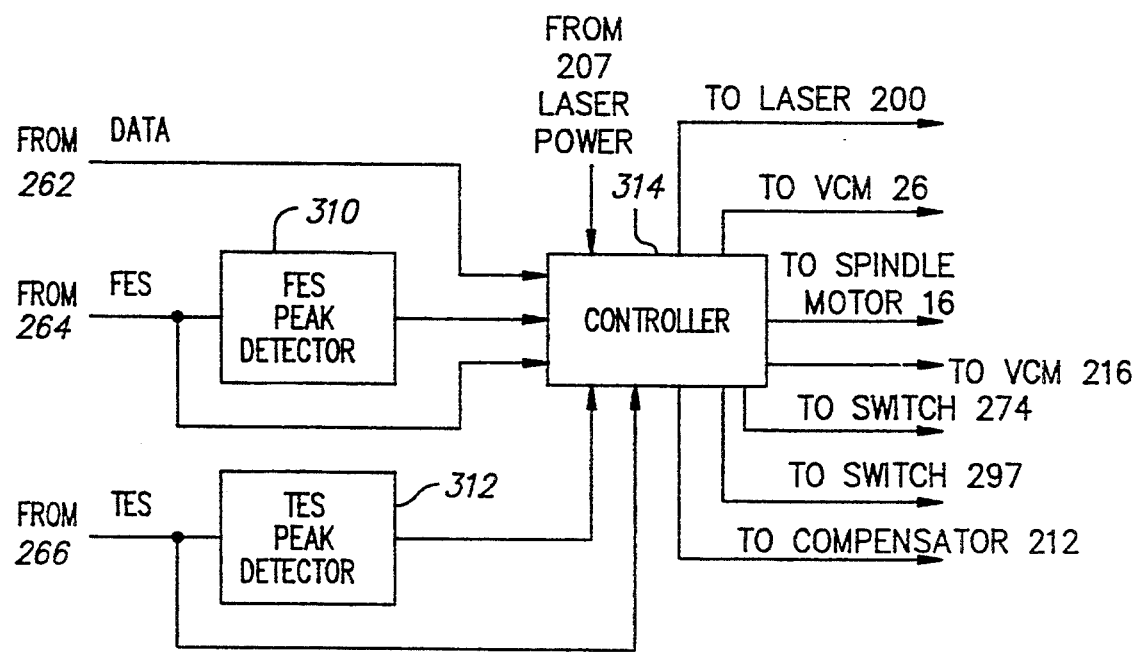
FIG. 7 is a schematic diagram of a controller circuit of the present invention.

FIG. 7 is a schematic diagram of a controller system of the present invention : and is designated by the general reference number 300. A focus error signal (FES) peak detector 310 is connected to the focus error signal circuit 264. A track error signal (TES) peak detector 312 is connected to the tracking error signal circuit 266. A controller 314 is connected to detector 310, detector 312, detector 207 and circuits 262, 264 and 266. Controller 314 is a microprocessor based disk drive controller. Controller 314 is also connected to and controls the laser 200, head motor 26, spindle motor 16, focus motor 216, switches 274 and 297, and compensator 212. The exact configuration and operation of compensator 212 is described in more detail below.

The operation of system 10 may now be understood. Controller 314 causes motor 16 to rotate disk 12 and causes motor 26 to move head 22 to the proper position below disk 12. See FIG. 4. Laser 200 is energized to read data from disk 12. The beam 202 is focussed by lens 210 on the data surface 96. The reflected beam 220 returns and is divided into beams 230, 242 and 244. Beam 230 is detected by detector 234 and is used to provide focus and tracking servo information, and beams 242 and 244 are detected by detectors 248 and 252, respectively, and are used to provide data signals.

See FIG. 5. When beam 202 is exactly focussed on data surface 96, beam 230 will have a circular cross-section 350 on detector 234. This will cause circuit 264 to output a zero focus error signal. If beam 202 is slightly out of focus one way or the other, beam 230 will fall as an oval pattern 352 or 354 on detector 234. This will cause circuit 264 to output a positive or negative focus error signal. Controller 314 will use the focus error signal to control motor 216 to move lens 210 until the zero focus error signal is achieved.

If beam 202 is focussed exactly on a track of data surface 96, then beam 230 will fall as a circular cross-section 350 equally between the sections A and B, and the sections D and C. If the beam is off track it will fall on the boundary between a tracking mark and the land. The result is that the beam is diffracted and cross-section 350 will move up or down. More light will be received by sections A and B, and less by sections C and D or vice versa.

FIG. 8A shows a graph of the TES produced by circuit 264 versus the displacement of head 22. Controller 314 causes VCM 26 to move head 22 across the surface of medium 12. TES peak detector 312 counts the peaks (maximum and minimum points) of the TES signals. There are two peaks between each track. By o counting the number of peaks, controller 314 is able to position the beam on the proper track. The TES signal at a land is a positive slope TES signal. Controller 314 uses this positive slope signal to lock the beam-on track. For example, a positive TES signal causes head 22 to move to the left toward the zero point land position and a negative TES signal causes the head 22 to move to the right toward the zero point land position. FIG. 8A is the signal derived from the preferred pattern 130 of medium 12 when switch 297 is in its initial position as shown in FIG. 6. The same signal is also generated for surface 90 of pattern 150, and surface 92 of pattern 170. The beam is automatically locked to the land because that is the position where there is a positive slope.

FIG. 8B shows a graph of the TES versus head displacement for surface 92 of pattern 150, surfaces 90 and 92 of pattern 160 and surface 90 of pattern 170 when switch 297 is in its initial position. Note that in this case the tracking marks are such that the positive slope signal occurs at the location of the tracking marks and so that the beam will automatically track on the tracking marks and not the land portions. Tracking on the tracking marks may be desirable in some circumstances.

FIG. 8C shows a graph of the TES versus head displacement for surface 92 of pattern 150, surfaces 90 and 92 of pattern 160 and surface 90 of pattern 170 when inverter switch 297 is enabled such that the TES signal is inverted. The TES now has a positive slope at the land positions and the beam will track on the land portion instead of the tracking marks. Thus, controller 314 can track the grooves or the lands by setting switch 297.

In the preferred embodiment, medium 12 contains ROM data surfaces. Reflectivity detection is used to read the ROM data. In data circuit 262, switch 274 is positioned to connect amplifier 276 when a ROM disk is to be read. The signal from detectors 248 and 252 is added. Less light is detected where data spots have been recorded and this difference in light detected is the data signal. Switch 274 will have the same setting for reading WORM and phase change data disk. If disk 12 has magneto-optical data surfaces, then polarization detection is needed to read the data. Switch 274 will be set to connect amplifier 278. The difference in the orthogonal polarization light detected at detectors 248 and 252 will then provide the data signal.

Figure 9:
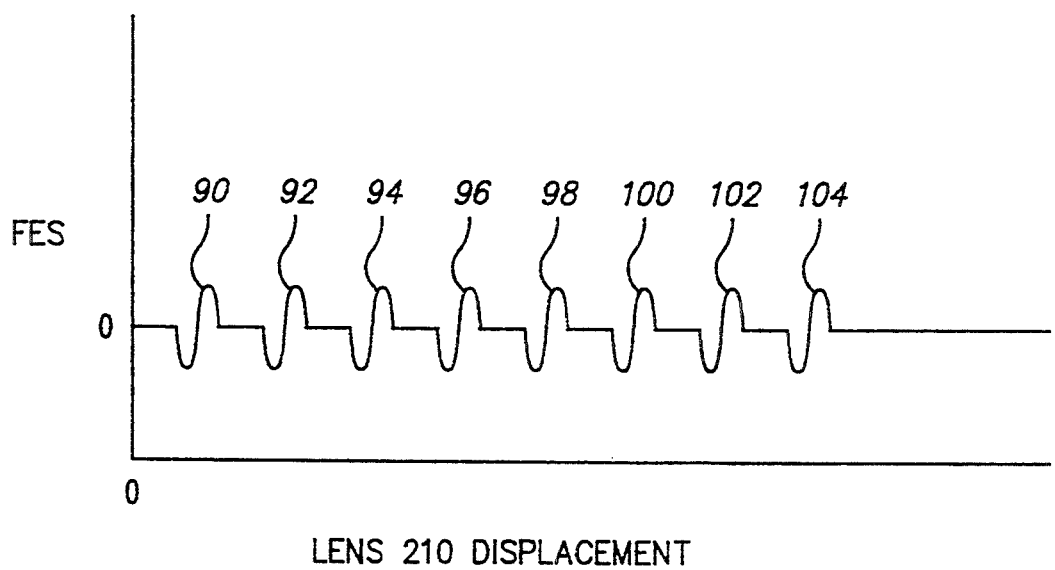
FIG. 9 is a graph of the focus error signal versus lens displacement for the present invention.

FIG. 9 shows a graph of the focus error signal from circuit 264 versus the displacement distance of lens 210. Note that a nominally sinusoidal focus error signal is obtained for each of the data surfaces of medium 12. Between the data layers, the focus error signal is zero. During startup of the system, controller 314 first causes motor 216 to position lens 210 at its zero displacement position. Controller 314 will then seek the desired data surface by causing motor 216 to move lens 210 in a positive displacement direction. At each data layer, peak detector 310 will detect the two peaks of the focus error signal. Controller 314 will count the peaks (two per data surface) and determine the exact data surface on which beam 202 is focussed. When the desired surfaces are reached, controller 314 causes motor 216 to position lens 210 such that the focus error signal is between the two peaks for that particular data surface. The focus error is then used to control the motor 216 to seek the zero point focus error signal between the peaks, i.e. lock on the positive slope signal such that exact focus is achieved. The controller 314 will also adjust the power of laser 200, the switch 297, and the aberration compensator 212 as appropriate for that particular data surface.

Also on startup, controller 314 determines what type of disk it is reading. Switch 274 is first positioned for reflectivity detection and switch 297 is set to read the land portions of the disk of the preferred pattern 130. The controller 314 seeks and reads the header information of the first track of the first data surface. The header has information on the number of layers, what type of optical media is in each layer (reflectivity or polarization detection), and what type of tracking mark patterns are used. With this information, the controller 314 is able to set switches 274 and 297 to correctly read each dam surface. For example, the disk may have four layers of ROM data surfaces and two layers of MO data surfaces. Controller 314 will set switch 274 to reflectivity detection for surfaces 1–4 and to polarization detection for surfaces 5–6.

If controller 314 is unable to read the first track of the first data surface (perhaps the first layer has a different tracking mark pattern), then controller 314 will set switch 297 to its other setting and will attempt to read the first track of the first data surface again. If this still does not work (perhaps the first data surface is magneto-optic and requires polarization detection) then the controller will set switch 274 to the polarization detection and try again, setting switch 297 at one setting and then the other. In summary, controller 314 will read the header information of the first track of the first data surface by trying the four different combinations of settings of switches 274 and 297 until it is successful at reading the track. Once controller 314 has this header information, it can correctly set the switches 274 and 297 for each of the other data surfaces.

Alternatively, the disk drive may be specifically dedicated to work with only one type of medium. In that case, controller 314 is preprogrammed to store information on the type of data surfaces, number of layers, and types of tracking marks.

The Aberration Compensator

Lenses are typically designed to focus light through air which has an index of refraction of 1.0. When such lenses focus light through materials having different indices of refraction, the light experiences a spherical aberration, which distorts and enlarges the beam spot, degrading the reading and recording performance.

In typical optical data storage systems, there is only one data surface onto which to focus. The data surface is usually located beneath a 1.2 mm thick face plate. The lens is typically a 0.55 numerical aperture (NA) lens which is specially designed to correct for spherical aberration caused on the light by the 1.2 mm face plate. The result is that a good spot focus can be obtained at that exact depth, but at other depths the focus gets blurry. This causes severe problems for any multiple data layer system.

Figure 10:
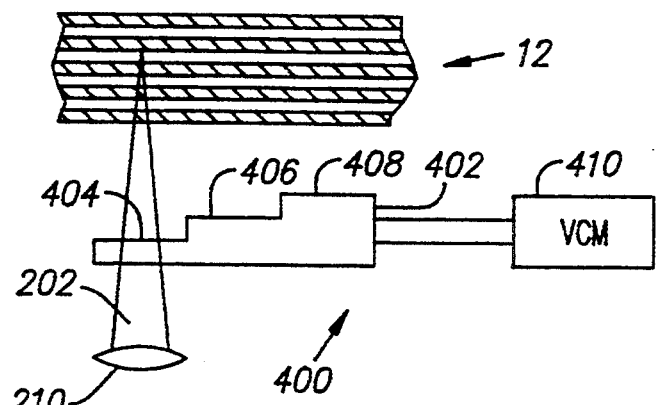
FIG. 10 is a schematic diagram of a multiple data surface aberration compensator of the present invention.

The aberration compensator 212 of the present invention solves this problem. FIG. 10 shows a schematic diagram of an aberration compensator which is designated by the general reference number 400 and may be used as compensator 212. Compensator 400 comprises a stepped block 402 having three steps. A first step 404 has a thickness of 0.4 mm, a second step 406 has a thickness of 0.8 mm and a third step 408 has a thickness of 1.2 mm. The block 402 is made of the same material as the face plate and substrates of medium 12 or other similar optical material. Note that these steps increase in optical thickness in increments of the substrate thickness. Block 402 is attached to a voice coil motor 410 (or similar actuator device) which in turn is connected to controller 314. Motor 410 moves block 402 laterally into and out of the path of beam 302.

Lens 210 is designed to focus on the lowest data surface of medium 12. In other words, lens 210 is designed to compensate for spherical aberrations caused by the combined thicknesses of the face plate and the intervening substrates. For the present invention, in order to focus on surface 102 or 104, beam 202 must pass through the face plate 50 and substrates 56, 62 and 68 (a combined thickness of 2.4 mm of the substrate material). Note that the air spaces 78 are not counted because they impart no additional spherical aberration. Lens 210 is thus designed to focus through 2.4 mm of polycarbonate and may focus equally well on both data surfaces 102 and 104.

When beam 202 is focussed on either surface 102 or 104, the block 402 is completely withdrawn and beam 202 does not pass through it. When beam 202 is focussed on surface 98 or 100, block 402 is positioned such that beam 202 passes through step 404. When beam 202 is focussed on surfaces 94 or 96, block 402 is positioned such that beam 202 passes through step 406. When beam 202 is focussed on surfaces 90 or 92, block 402 is positioned such that beam 202 passes through step 408. The result is that no matter which pair of surfaces are focussed on, beam 202 will always pass through the same total optical thickness of material and will not experience spherical aberration problems. Controller 314 controls motor 410 to move the block 402 as appropriate.

Figure 11:
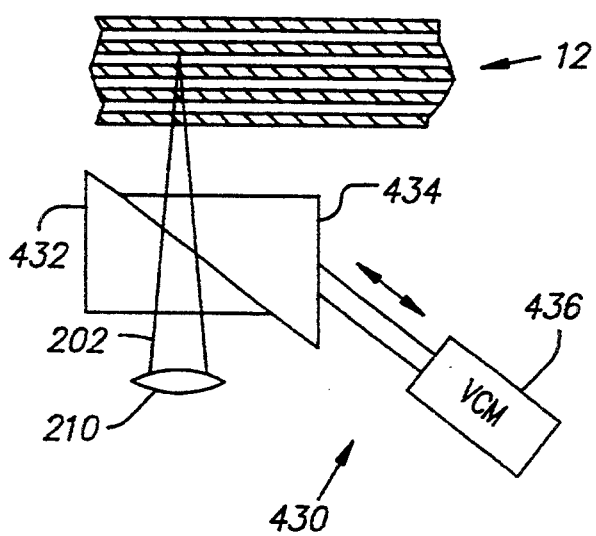
FIG. 11 is a schematic diagram of an alternative embodiment of a multiple data surface aberration compensator of the present invention.

FIG. 11 shows an aberration compensator which is designated by the general reference number 430 and which may be used for compensator 212. Compensator 430 has a pair of complementary triangular shaped blocks 432 and 434. Blocks 432 and 434 are made of the same material as face plate and substrates of medium 12 or material of similar optical properties. Block 432 is positioned in a fixed position such that beam 202 passes through it. Block 434 is attached to a voice coil motor 436 and may be slid along the surface of block 432. Controller 314 is connected to and controls motor 436. By moving block 434 relative to block 432 the overall thickness of material through which beam 202 passes may be adjusted. The result is that beam 202 passes through the same optical thickness of material no matter which data surface it is focussed on.

Figure 12:
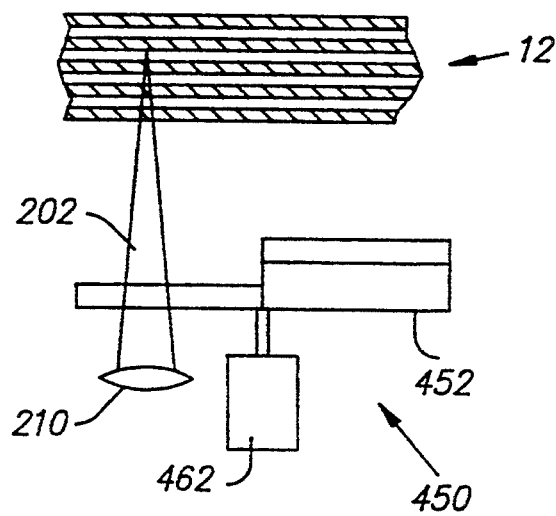
FIG. 12 is a schematic diagram of an additional alternative embodiment of a multiple data surface aberration compensator of the present invention.
Figure 13:
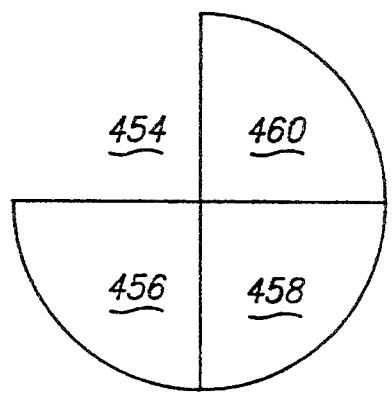
FIG. 13 is a top view of the compensator of FIG. 12.

FIGS. 12 and 13 show an aberration compensator which is designated by the general reference number 450 and may be used for compensator 212. Compensator 450 has a circular stepped element 452. Element 452 has four sections 454, 456, 458 and 460. Sections 456, 458 and 460 have thicknesses similar to steps 404, 406 and 408, respectively, of compensator 400. Section 454 has no material and represents a blank space in the circular pattern as shown in FIG. 13. The circular element 452 is attached to a stepper motor 462 which in turn is controlled by controller 314. Spindle 462 rotates element 452 such that beam 202 passes through the same thickness of material no matter which data surface it is focussed on.

Figure 14:
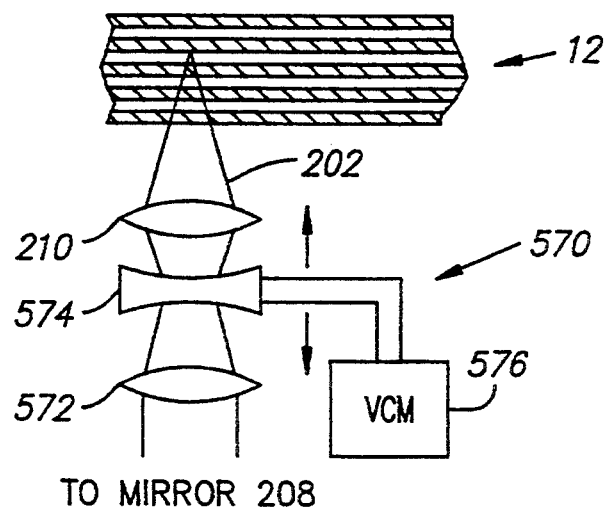
FIG. 14 is a schematic diagram of an additional alternative embodiment of a multiple data surface aberration compensator of the present invention.

FIG. 14 shows an aberration compensator which is designated by the general reference number 570 and may be used for compensator 212. Compensator 570 comprises a stationary convex lens 572 and a moveable concave lens 574. Lens 574 is attached to a voice coil motor 576. Voice coil motor 576 is controlled by controller 314 to move lens 574 relative to lens 572. Beam 202 passes through lens 572, lens 574 and lens 210 to medium 12. Moving lens 574 relative to lens 572 changes the spherical aberration of beam 202 and allows it to focus on the different data surfaces. In a preferred embodiment lenses 210, 574 and 572 comprise a Cooke triplet having movable center element 574. Cooke triplets are described in more detail in the article by R. Kingslake, "Lens Design Fundamentals," Academic Press, New York, 1978, pp. 286–295. Although lens 574 is shown as the moving element, alternatively, lens 574 could be stationary and lens 572 used as the moving element. In FIG. 4 the aberration compensator 212 is shown between lens 210 and medium 12. However, if compensator 570 is used it will be located between lens 210 and mirror 208 as shown in FIG. 14.

Figure 15:
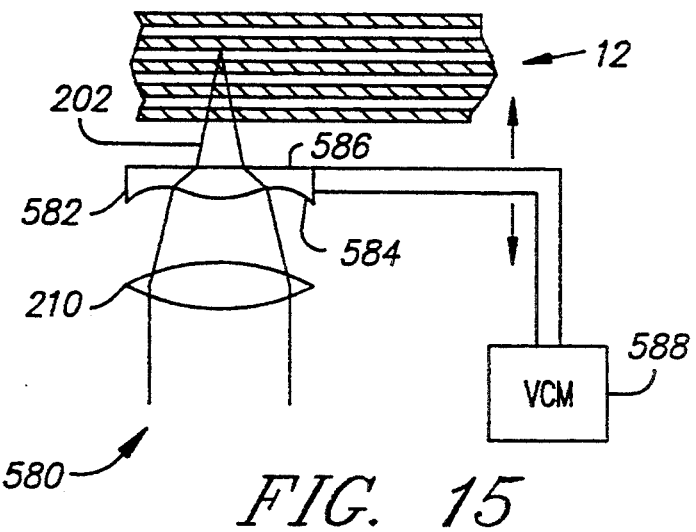
FIG. 15 is a schematic diagram of an alternative embodiment of a multiple data surface aberration compensator of the present invention.

FIG. 15 shows an aberration compensator which is designated by the general reference number 580. Compensator 580 comprises an aspheric lens element 582 with nominally zero focal power. Element 582 has a spherical aberration surface 584 and a planar surface 586. Lens 582 is connected to a voice coil motor 588.

Voice coil motor 588 is controlled by controller 314 which moves lens 582 relative to lens 512. Beam 202 passes through lens 210 and lens 582 to medium 12. Moving lens 582 relative to lens 210 changes the spherical aberration of the beam 202 and allows it to focus on the different data surfaces.

Figure 16:
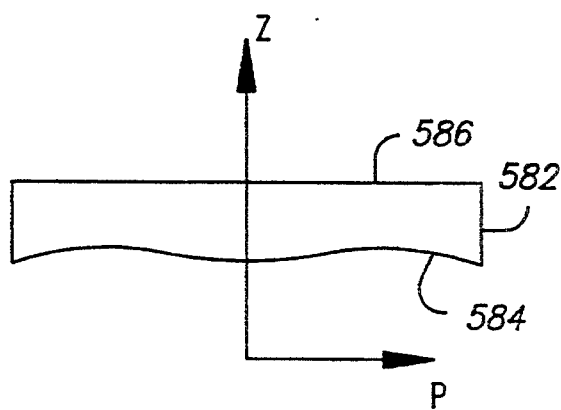
FIG. 16 is a cross-sectional view of the lens of FIG. 15.
Figure 17:
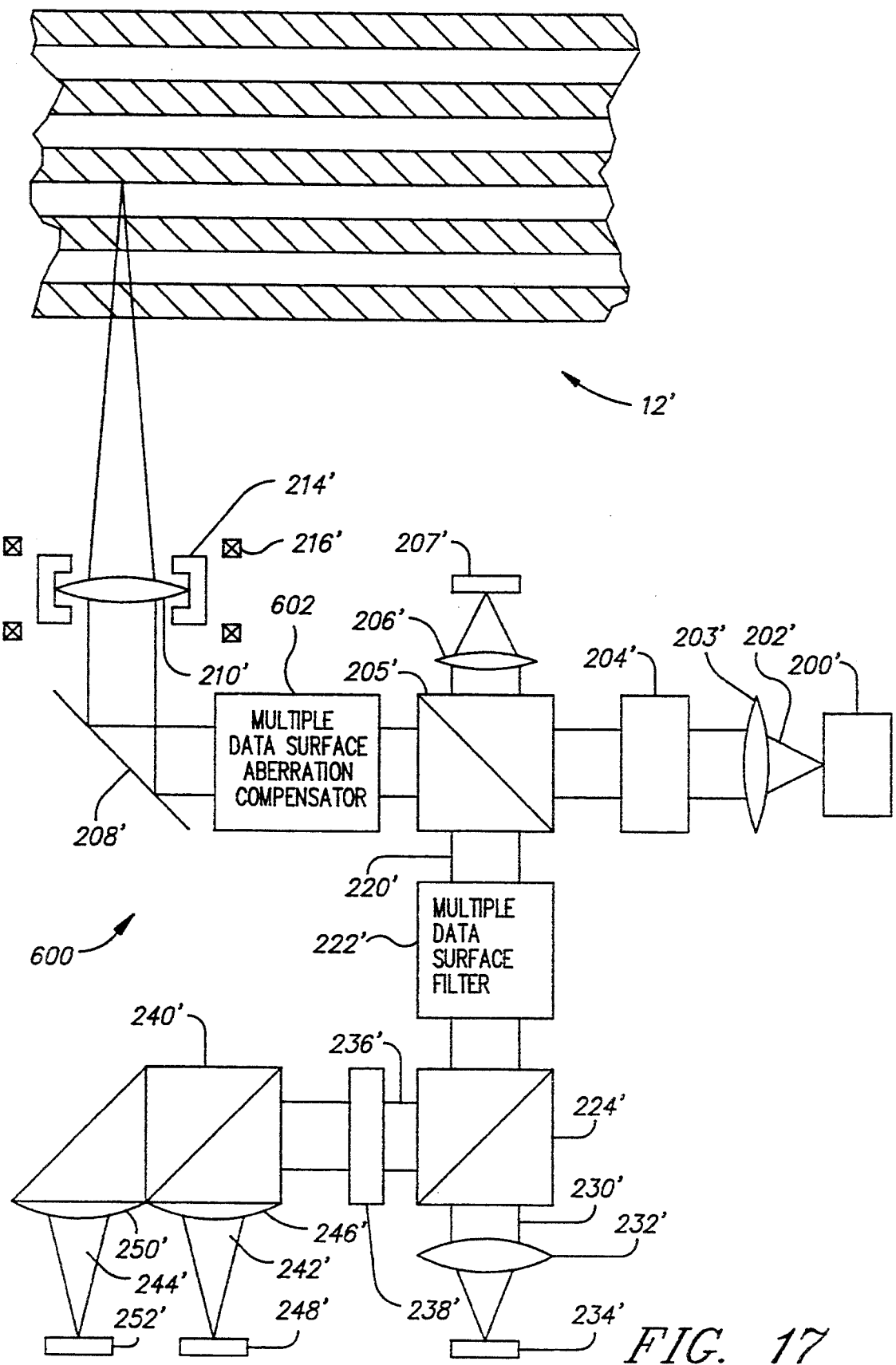
FIG. 17 is a schematic diagram of an alternative embodiment of an optical head and medium of the present invention.

FIG. 16 shows a view of lens 582 relative to axes z and p. In a preferred embodiment, the surface of 584 should correspond to the formula FIG. 17 shows a schematic diagram of an alternative optical head of the present invention and is designated by the general reference number 600. Elements of head 600 which are similar to elements of head 22 are designate by a prime number. Note that head 600 is similar to system 10 except that the aberration compensator 212 has been eliminated and a new aberration compensator 602 has been added between beamsplitter 206' and mirror 208'. The description and operation of compensator 602 is described below. The operation of head 600 is otherwise the same as described for head 22. Head 600 may be substituted for head 22 in system 10.

Figure 18:
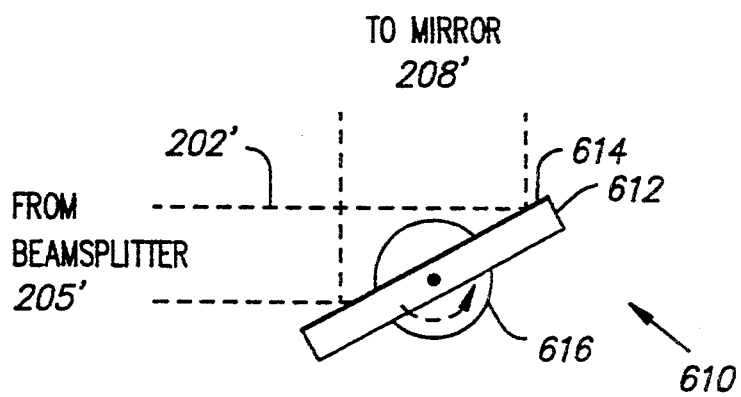
FIG. 18 is a schematic diagram of an alternative embodiment of a multiple data surface aberration compensator of the present invention.

FIG. 18 shows a schematic diagram of an aberration compensator which is designated by the general reference number 610 and may be used for compensator 602. Compensator 610 comprises a substrate 612 having a reflective holographic coating 614. Substrate 612 is attached to a stepper motor 616 which in turn is controlled by controller 314. Holographic coating 614 has a number of different holograms recorded, each of which imparts a particular spherical aberration to beam 202'. These holograms are of the Bragg type which are sensitive only to light incident at a specific angle and wavelength. When substrate 612 is rotated a few degrees, beam 202' will experience a different hologram. The number of holograms recorded corresponds to the number of different spherical aberration corrections required. For medium 12 as shown, four different recordings are necessary each o corresponding to one of the pairs of data surfaces. .

Figure 19:
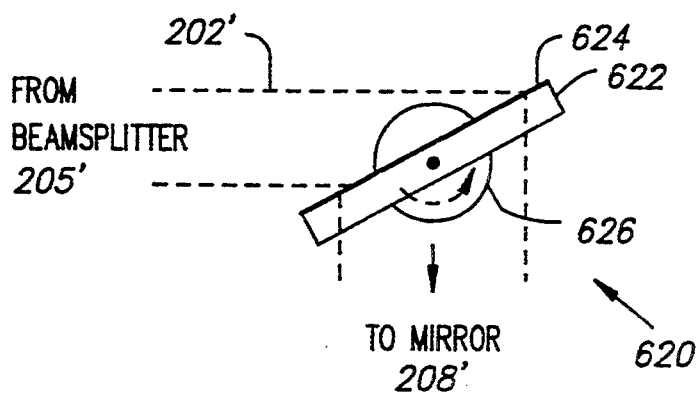
FIG. 19 is a schematic diagram of an alterative embodiment of a multiple data surface aberration compensator of the present invention.

FIG. 19 shows a schematic diagram of an aberration compensator which is designated by the general reference number 620 and may be used for compensator 602. Compensator 620 comprises a substrate 622, a transmissive holographic coating 624 and a stepper motor 626. The compensator 620 is similar to compensator 610 except that here the holographic coating 624 is transmissive rather than reflective. Holographic coating 624 has a number of holograms recorded, each of which corresponds to the amount of spherical aberration compensation required. Beam 202' experiences each of these holograms in turn as substrate 622 is rotated.

Figure 20:
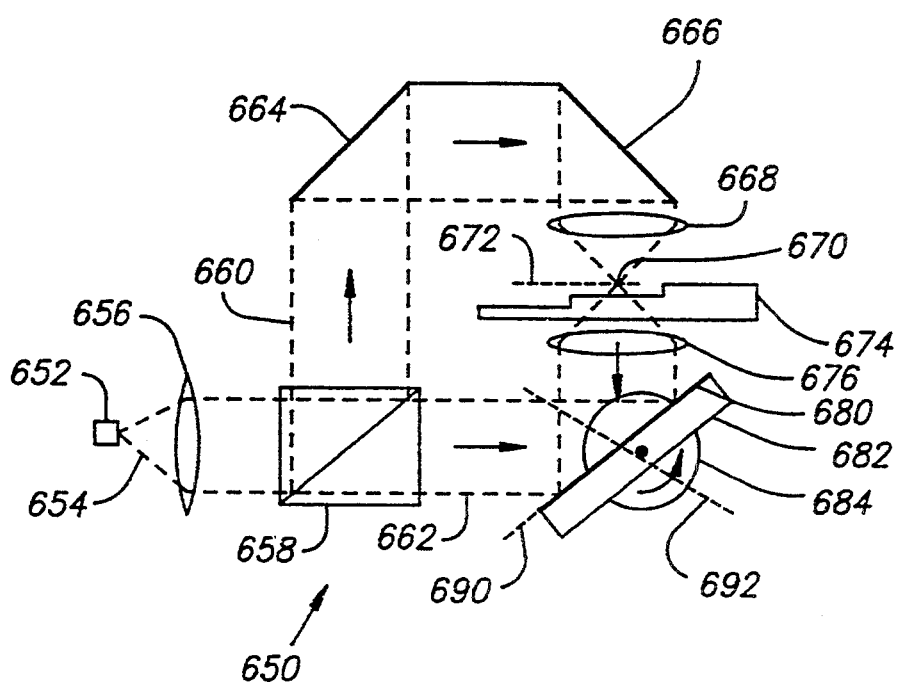
FIG. 20 is a schematic diagram showing the process of manufacturing the compensator of FIGS. 18 and 19.

FIG. 20 shows a schematic diagram of a recording system used to make the holographic coatings 614 and 624, and is designated by the general reference number 650. System 650 has a laser 652 which produces a light beam 654 at a frequency similar to the laser 200. Light 654 is collimated by lens 656 and is passed to a beamsplitter 658. Beamsplitter 658 divides the light into a beam 660 and a beam 662. Beam 660 is reflected by a mirror 664 and 666, and is focussed by a lens 668 to a point 670 in a plane 672. Beam 660 passes through a stepped block 674 similar to block 402. Beam 660 is then recollimated by a lens 676 and falls upon a holographic coating 680 on a substrate 682. Substrate 682 is rotatably mounted to a stepper motor 684. Beam 662 also falls upon coating 680 at a 90 degree angle from beam 660.

Lens 668 forms an unaberrated spot on plane 672. This light is then passed through a step of block 674 which has a thickness representing the sum of the substrate thicknesses which will be encountered in accessing a particular recording layer. Lens 676 is identical in design to lens 210 as used in the optical storage head. It collimates the light into a beam that contains a specific amount of spherical aberration corresponding to the specific thickness. This wavefront is holographically recorded by interference with the reference beam 662. If the hologram is oriented in approximately a plane 690 as shown, a transmission hologram is recorded. If it is oriented in approximately a plane 692 as shown as a dash line, a reflective hologram is recorded. The wavefront required to correct the aberrations encountered in accessing a different pair of recording layers is holographically stored by rotating the hologram to a new angular position and inserting the corresponding thickness plate of block 674. A multiplicity of angularly resolved holograms are recorded, each corresponding to mid providing correction for a different pair of recording layers. The holographic coating may be made of dichromated gelatin or a photopolymer material. The individual holograms can be recorded in increments as small as one degree without appreciable cross-talk. This permits large numbers of holograms to be recorded and correspondingly large numbers of data surfaces to be used.

Figure 21:
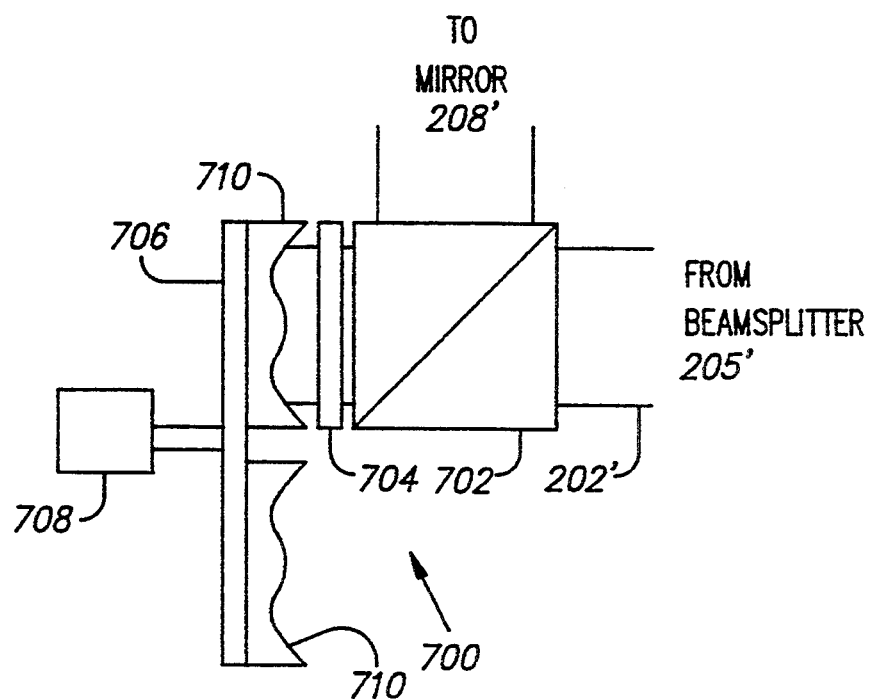
FIG. 21 is a schematic diagram of an alternative embodiment of the aberration compensator of the present invention.

FIG. 21 shows a schematic diagram of an alternative aberration compensator which is designated by the general reference number 700 and may be used for compensator 602. Compensator 700 comprises a polarizing beamsplitter 702, a quarter waveplate 704, a carousel 706 attached to a stepper motor 708 and a plurality of spherical aberration mirrors 710 each providing a different spherical aberration correction. Beam 202' is oriented with its polarization such that it passes through beamsplitter 702 and plate 704 to one of mirrors 710. Mirror 710 imparts the appropriate spherical aberration to the beam 202' which then returns through plate 704 and is reflected by beamsplitter 702 to mirror 208'. Motor 708 is controlled by controller 314 to rotate the carousel 706 to position the appropriate mirror in place. Mirrors 710 are reflecting Schmidt corrector plates. See M. Born, et al., "Principles of Optics," Pergonan Press Oxford, 1975, pp. 245-249.

Figure 22:
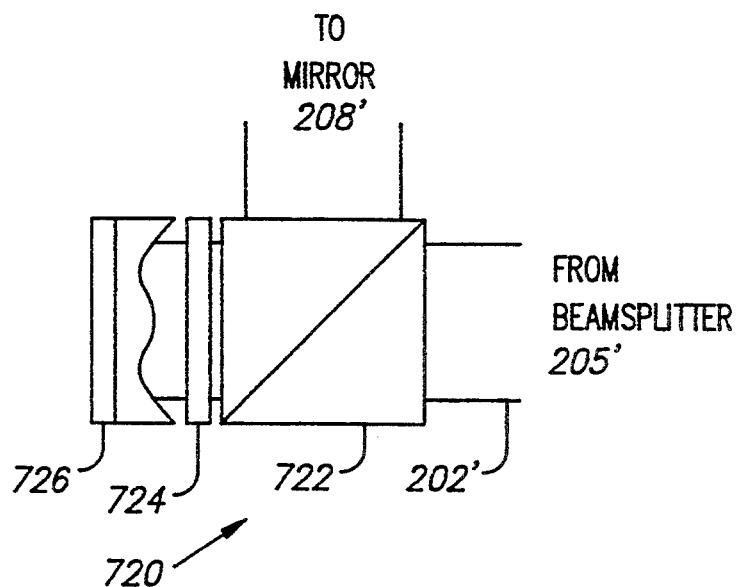
FIG. 22 is a schematic diagram of an alterative embodiment of the aberration compensator of the present invention.

FIG. 22 shows a schematic diagram of an aberration compensator which is designated by the general reference number 720 and may be used for compensator 602. Compensator 720 comprises a polarizing beamsplitter 722, a quarter waveplate 724 and an electrical controlled deformable mirror 726. Deformable mirror 726 is controlled by internal piezo-electric elements and is described in more detail in J. P. Gaffarel, et al., "Applied Optics," Vol. 26, pp. 3772-3777, (1987). The operation of compensator 720 is similar to compensator 700, except that mirror 726 is electrically adjusted to provide the appropriate spherical aberration. In other words, mirror 726 is adjusted to form a reflective surface corresponding to the different Schmidt corrector plates 710 of compensator 700. Controller 314 controls the adjustment of mirror 726 as appropriate.

The operation of the aberration compensators 212 and 602 have been described above in connection with medium 12. Due to the air space between the layers, one aberration compensation setting will work for each pair of data surfaces. However, in the case where medium 120 is used, aberration compensation settings will need to be made for each data surface. This is because there are no air spaces.

Multiple Data Surface Filter

When beam 202 is focussed on a particular data surface of medium 12 a reflected beam 230 is returned to head 22 from that surface. However, some of light beam 202 is also reflected at the other data surfaces. This unwanted reflected light must be screened out for proper data and servo signals to be obtained. The multiple data surface filter 222 of the present invention achieves this function.

Figure 23:
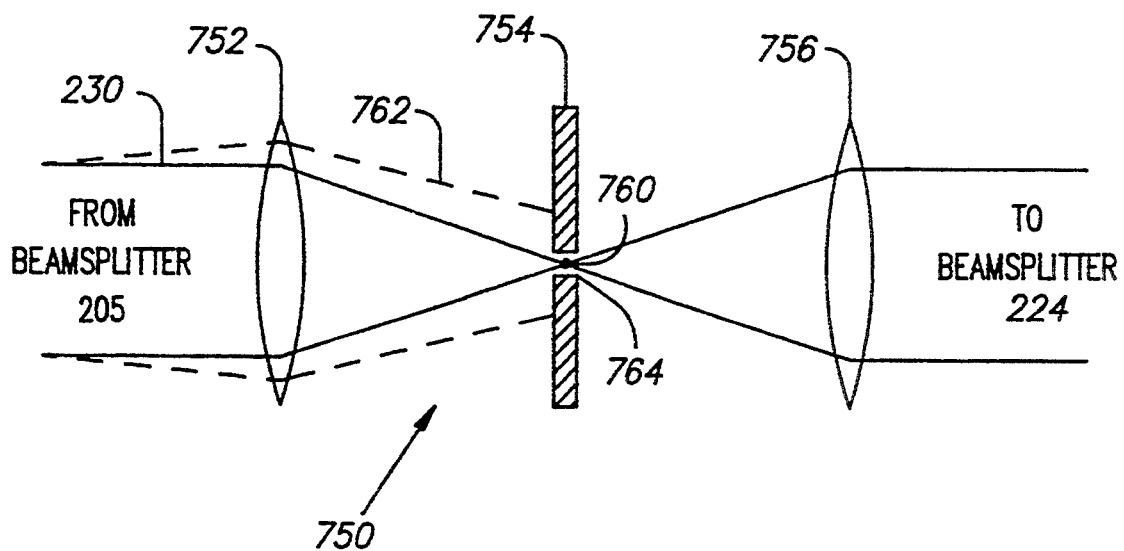
FIG. 23 is a schematic diagram of a multiple data surface filter of the present invention.

FIG. 23 shows a schematic diagram of a filter 750 which may be used as filter 222. Filter 750 comprises a blocking plate 754 and a lens 756. The desired light beam 230 is collimated because it is the light which has been properly focussed by lens 210. Beam 230 is focussed by lens 752 to a point 760. Unwanted light 762 is not properly focussed by lens 210 and is thus not collimated. The light 762 will not focus to point 760. Plate 764 has an aperture 764 at point 760 which allows light 230 to pass. Most of the unwanted light 762 is blocked by plate 754. The light 230 is recollimated by lens 756. In a preferred embodiment aperture 764 is circularly shaped and has a diameter of approximately $\lambda/(2*(NA))$, where $\lambda$ is the wavelength of the light and N.A. is the numerical aperture of lens 752. The exact diameter is determined by the desired trade-off between alignment tolerances and interlayer signal rejection requirements. Alternatively, aperture 764 may be a slit having a minimum gap distance of approximately $\lambda/(2*(NA))$. In such a case plate 764 could be two separate members which are separated by the slit. Plate 754 may be made of a metal sheet or may be made of a transparent substrate having a light blocking coating with aperture 764 being uncoated.

Figure 24:
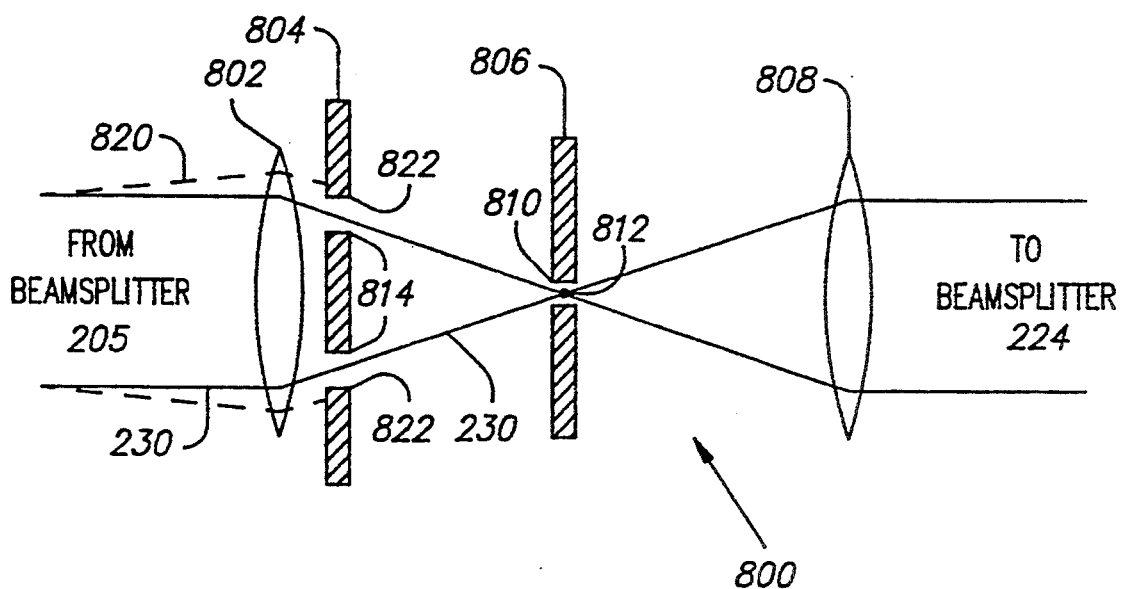
FIG. 24 is a schematic diagram of an alterative embodiment of a multiple data surface filter of the present invention.

FIG. 24 shows a schematic diagram of a filter 800 which also may be used as filter 222. Filter 800 comprises a lens 802, a blocking plate 804, a blocking plate 806 and a lens 808. Plate 806 has an aperture 810 located at a focal point 812 of lens 802. Plate 804 has a complementary aperture 814 which allows the collimated light 230 to be directed through aperture 810 while blocking unwanted uncollimated light 820. Aperture 814 may be a pair of parallel slits or an annular aperture. In a preferred embodiment, the distance between the slits of aperture 814 is greater than the diameter of aperture 810. The diameter of aperture 810 is approximately equal to $\lambda/(2*(NA))$. For the alternative annular shaped aperture, the inner diameter of the annular slit should be greater than the diameter of aperture 810. In both cases, the outer edge 822 of aperture 814 is located outside of beam 230. Blocking plates 804 and 806 may be made of a metal sheet or may be made of a transparent substrate having a light blocking coating with apertures 810 and 814 being uncoated.

Figure 25:
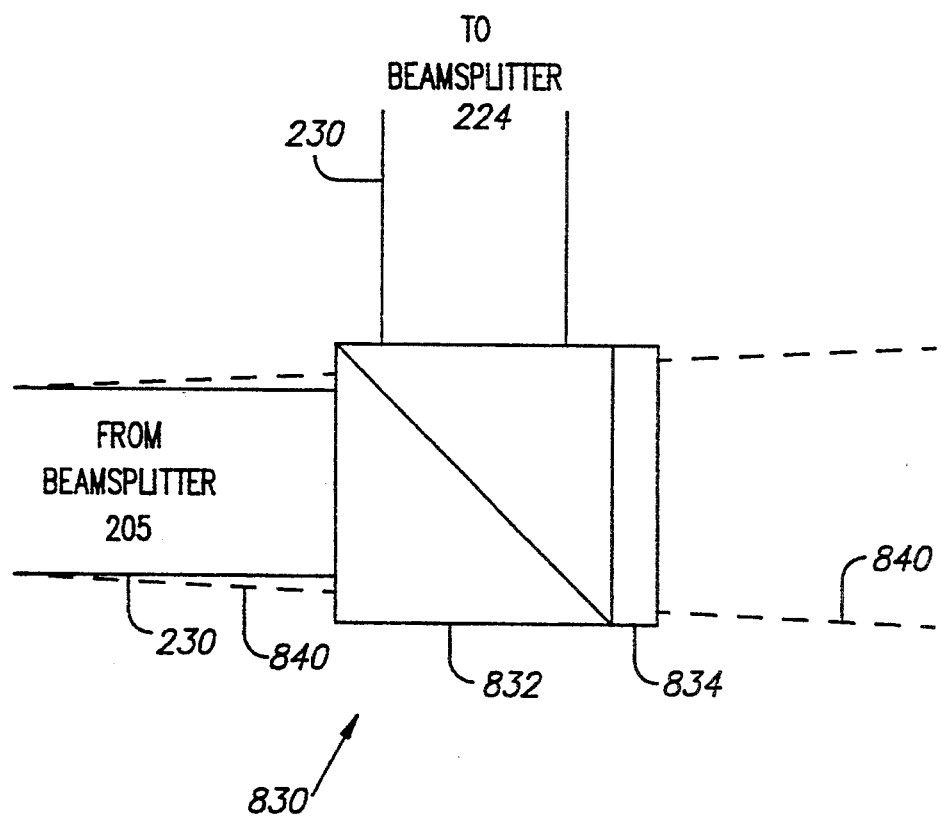
FIG. 25 is a schematic diagram of an alterative embodiment of a multiple data surface filter of the present invention.

FIG. 25 shows a schematic diagram of an alternative filter 830 which may be used as filter 222. Filter 830 comprises a beamsplitter 832 and a holographic plate 834. The coating on the holographic plate 834 is tuned to efficiently reflect collimated beam 230 while uncollimated beam 840 is allowed to pass. The desired beam 230 is reflected from holographic plate 834 and returns to beamsplitter 832 where it is reflected towards beamsplitter 224.

Figure 26:
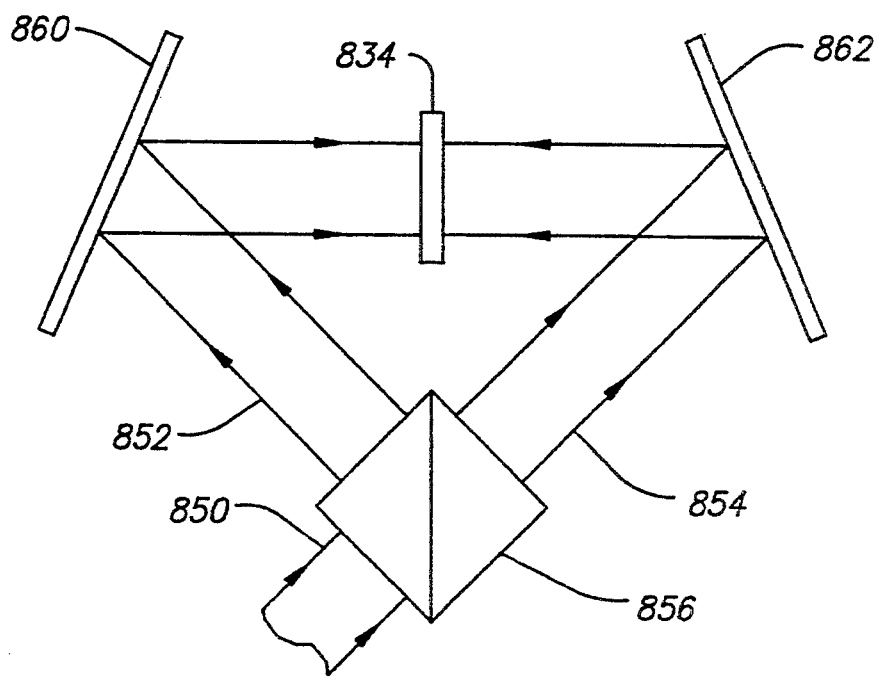
FIG. 26 is a schematic diagram showing the process of manufacturing the filter of FIG. 25.

FIG. 26 is a schematic diagram which shows how holographic plate 834 is made. A collimated laser beam 850 having approximately the same wavelength as laser 200 is split into two beams 852 and 854 at an amplitude beamsplitter 856. Beams 852 and 854 are directed by mirrors 860 and 862, respectively, and fall upon hologram plate 834 from opposite directions perpendicular to the surface of plate 834. A reflective hologram is recorded by the interference of beams 852 and 854. The holographic coating may be made of a dichromated gel or photopolymer material.

Filters 222 of the present invention have been shown in FIG. 4 to be located in the path of beam 220. However, one or more filters can be located in the separate paths of servo beam 230 or the data beam 236.

While the preferred embodiments of the present invention have been illustrated in detail, it should be apparent that modifications and adaptations to those embodiments may occur to one skilled in the art without departing from the scope of the present invention as set forth in the following claims.

We claim:
1. An optical data storage system comprising:
   an optical data storage medium having at least one contiguous data surface, each data surface having a first continuous track portion at a first elevation and having a second continuous track portion at a second elevation different from the first elevation;
   a radiation source for producing a radiation beam;
   a focusing device for focusing the radiation beam to a selected one of the data surfaces;
   a movement device for moving the medium relative to the radiation beam;
   a data signal generator for receiving a return radiation beam from the medium and generating a data signal responsive thereto;
   a tracking signal generator for receiving a return radiation beam from the medium and selectively generating a first and a second tracking signal; and
   a beam positioning device connected to the track signal generator for positioning the beam along the first continuous track portion of a data surface responsive to the first tracking signal and positioning the beam along the second continuous track portion of the same data surface responsive to the second tracking signal.
2. The system of claim 1, wherein the first continuous track portion is comprised of a groove.
3. The system of claim 1, wherein the first continuous track portion is comprised of an inverse groove.
4. The system of claim 1, wherein the optical data storage medium has a plurality of data surfaces.
5. The system of claim 4, wherein the first continuous track portion of a first data surface comprises a groove, and the first continuous track portion of a second data surface comprises an inverse groove.
6. The system of claim 4, wherein the first continuous track portions of a first data surface and a second data surface are comprised of grooves.
7. The system of claim 4, wherein the first continuous track portions of a first data surface and a second data surface are comprised of inverse grooves.
8. The system of claim 4, wherein a first and a second data surface of the optical data storage medium are separated by an air space.
9. The system of claim 4, wherein a first and a second data surface of the optical data storage medium are separated by a solid transparent member.
10. The system of claim 1, wherein the ratio of the width of the first continuous track portion to the width of the second continuous track portion is 0.6.
11. The system of claim 1, wherein at least one of the data surfaces comprises a ROM data surface.

12. The system of claim 1, wherein at least one of the data surfaces comprises a WORM material coating.

13. The system of claim 1, wherein at least one of the data surfaces comprises a phase change material coating.

14. The system of claim 1, wherein at lease one of the data surfaces comprises a magneto-optic material coating.

15. The system of claim 1, wherein the radiation source comprises a laser.

16. The system of claim 1, wherein the optical data storage medium comprises a first substrate having a first data surface, a second substrate having a second data surface, a support device for supporting the first and second substrates in spaced apart relationship, an air space located between the first and second substrates, the first data surface located between the first substrate and the air space, and the second data surface located between the second substrate and the air space.

17. The system of claim 1, wherein the optical data storage medium comprises a first substrate having a first data surface, a second substrate having a second data surface, a solid transmissive member located between the first and second substrate, the first data surface located between the first substrate and the transmissive member and the second data surface located between the second substrate and the transmissive member.

18. The system of claim 1, wherein the optical data storage medium is a disk and the first and second continuous track portions are located in a spiral pattern on the data surfaces.

19. The system of claim 1, wherein the optical data storage medium is a disk and the first and second continuous track portions are located in a concentric pattern on the disk.

20. An optical data storage system comprising:
   an optical data storage medium having at least one contiguous data surface, each data surface having a first continuous track portion at a first elevation and having a second continuous track portion at a second elevation different from the first elevation;
   a radiation source for producing a radiation beam;
   a focusing device means for focusing the radiation beam to a selected one of the data surfaces;
   a movement device for moving the medium relative to the radiation beam;
   a data signal generator for receiving a return radiation beam from the medium and generating a data signal responsive thereto;
   an optical detector having a first and second sections for receiving a return radiation beam from the medium, each section generating an intensity signal responsive to the amount of radiation received at each section;
   a comparator device connected to the optical detector for comparing the intensity signals and generating a tracking signal responsive thereto;
   a selective inversion device connected to the comparator device for selectively generating an inverted tracking signal; and
   a beam positioning device for receiving the tracking signal and the inverted tracking signal and positioning the beam along the first continuous track portion of a data surface responsive to the tracking signal and positioning the beam along the second continuous track portion of the same data surface responsive to the inverted tracking signal.

21. The system of claim 20, wherein the first continuous track portion is comprised of a groove.

22. The system of claim 20, wherein the first continuous track portion is comprised of an inverse groove.

23. The system of claim 21, wherein the optical data storage medium has a plurality of data surfaces.

24. The system of claim 23, wherein the first continuous track portion of a first data surface comprises a groove, and the first continuous track portion of a second data surface comprises an inverse groove.

25. The system of claim 23, wherein the first continuous track portions of a first data surface and a second data surface are comprised of grooves.

26. The system of claim 23, wherein the first continuous track portions of a first data surface and a second data surface are comprised of inverse grooves.

27. The system of claim 23, wherein a first and a second data surface of the optical data storage medium are separated by an air space.

28. The system of claim 23, wherein a first and a second data surface of the optical data storage medium are separated by a solid transparent member.

29. The system of claim 20, wherein the ratio of the width of the first continuous track portion to the width of the second continuous track portion is 0.6.

30. The system of claim 20, wherein at least one of the data surfaces comprises a ROM data surface.

31. The system of claim 20, wherein at least one of the data surfaces comprises a WORM material coating.

32. The system of claim 20, wherein at least one of the data surfaces comprises a phase change material coating.

33. The system of claim 20, wherein at least one of the data surfaces comprises a magneto-optic material coating.

34. The system of claim 20, wherein the radiation source comprises a laser.

35. The system of claim 20, wherein the optical data storage medium comprises a first substrate having a first data surface, a second substrate having a second data surface, a support device for supporting the first and second substrates in spaced apart relationship, an air space located between the first and second substrates, the first data surface located between the first substrate and the air space, and the second data surface located between the second substrate and the air space.

36. The system of claim 20, wherein the optical data storage medium comprises a first substrate having a first data surface, a second substrate having a second data surface, a solid transmissive member located between the first and second substrate, the first data surface located between the first substrate and the transmissive member and the second data surface located between the second substrate and the transmissive member.

37. The system of claim 20, wherein the optical data storage medium is a disk and the first and second continuous track portions are located in a spiral pattern on the data surface.

38. The system of claim 20, wherein the optical data storage medium is a disk and the first and second continuous track portions are located in a concentric pattern on the disk.

* * * * *